United States Patent [19]
Kingsley et al.

[11] Patent Number: 5,810,448
[45] Date of Patent: Sep. 22, 1998

[54] SELF PROPELLED SAW

[75] Inventors: Michael G. Kingsley, Independence; Kevin R. Wilson, Blue Springs, both of Mo.; Donald F. Meister, Overland Park, Kans.

[73] Assignee: Diamant Boart, Inc., Olathe, Kans.

[21] Appl. No.: 772,363

[22] Filed: Dec. 23, 1996

Related U.S. Application Data

[62] Division of Ser. No. 370,374, Jan. 9, 1995, abandoned.

[51] Int. Cl.$^6$ .............................. E01C 23/09; B28D 1/04
[52] U.S. Cl. .......................... 299/39.3; 125/14; 299/39.6
[58] Field of Search ................................ 299/39.3, 39.6; 125/13.03, 14

[56] References Cited

U.S. PATENT DOCUMENTS

| | | | |
|---|---|---|---|
| 0,528,145 | 10/1984 | Carrr | 474/84 |
| 0,660,750 | 10/1900 | Cunningham | 474/84 |
| 1,553,845 | 9/1925 | Bardol | 299/39.3 |
| 2,244,742 | 10/1941 | Tyson | 299/1.5 |
| 2,588,953 | 3/1952 | Bausch et al. | 30/379 |
| 2,694,421 | 11/1954 | Shrewsbury | 30/379 |
| 2,770,266 | 11/1956 | Way | 30/379 |
| 2,783,789 | 3/1957 | Konway | 30/379 |
| 3,333,897 | 8/1967 | Rhodes | 299/39.6 |
| 3,547,492 | 12/1970 | Binger | 299/39.3 |
| 3,744,336 | 7/1973 | Lancaster | 74/473 R |
| 4,333,685 | 6/1982 | Arnswald | 299/39.4 |
| 4,787,678 | 11/1988 | Holmes et al. | 299/39.3 |
| 4,815,263 | 3/1989 | Hartung et al. | 56/235 |
| 4,848,845 | 7/1989 | Kennedy | 299/39.3 |
| 4,921,308 | 5/1990 | Yelton et al. | 299/39.3 |
| 4,960,008 | 10/1990 | Yen et al. | 74/473 R |
| 4,961,539 | 10/1990 | Deem | 241/36 |
| 5,067,362 | 11/1991 | Holderreid | 74/335 |
| 5,452,943 | 9/1995 | Campbell | 299/39.3 |
| 5,477,844 | 12/1995 | Meister | 125/14 |
| 5,566,582 | 10/1996 | Beadle et al. | 74/475 |

OTHER PUBLICATIONS

"Floor Cutters" by Lissmac, published during 1985.
"Operating Instructions—Parts List for Super Quadramatic Concrete/Asphalt Saws", Published by Target Products, Inc., Kansas City Missouri, May of 1990.
"Concut—Concrete Sawing, Safety Grooving & Bumpcutting Equipment" brochure distributed by Concut, Inc. Of Kent, Washington, distributed in 1984.
"Target Safetrac Systems Rebuilding America'S Infrastructure" brochure published by Target Products, Inc., Kansas City, Missouri, Aug. of 1985.

*Primary Examiner*—David J. Bagnell
*Attorney, Agent, or Firm*—Shook, Hardy & Bacon

[57] ABSTRACT

A concrete saw is provided having an engine aligned along a longitudinal axis of the saw frame to minimize the width of the saw and provide a more balanced system. A clutch assembly is attached to a forward end of the engine to disengage the saw blade without stopping the engine. A right angle gear box is provided proximate the driven side of the clutch assembly to transfer driving rotational forces from the engine to a transversely aligned driven shaft. The driven shaft includes drive pulleys mounted upon opposite ends thereof, which are aligned with driven pulleys mounted upon opposite ends of a blade support shaft and linked to one another via multiple belts. This alignment evenly balances the load transfer while facilitating the use of vibration isolators between the engine, gear box and frame. A hydraulically controlled depth stop mechanism is included for setting a maximum cut depth. The engine speed is controlled by an electronic governor. A multi-speed transmission is included to afford high and low ranges for the saw. A single control lever is provided to shift between high and low ranges, between forward and reverse directions, and to raise and lower the saw.

8 Claims, 10 Drawing Sheets

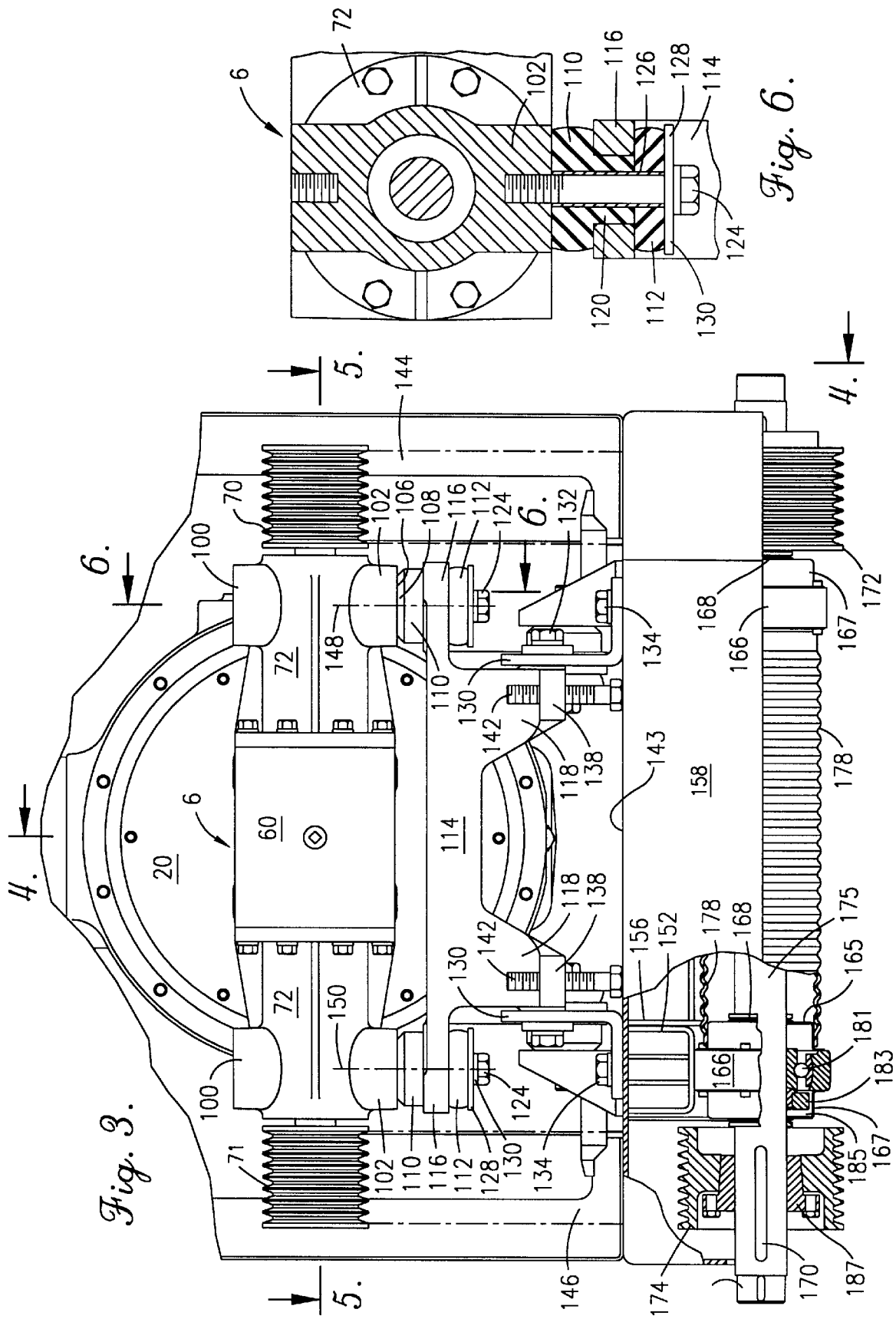

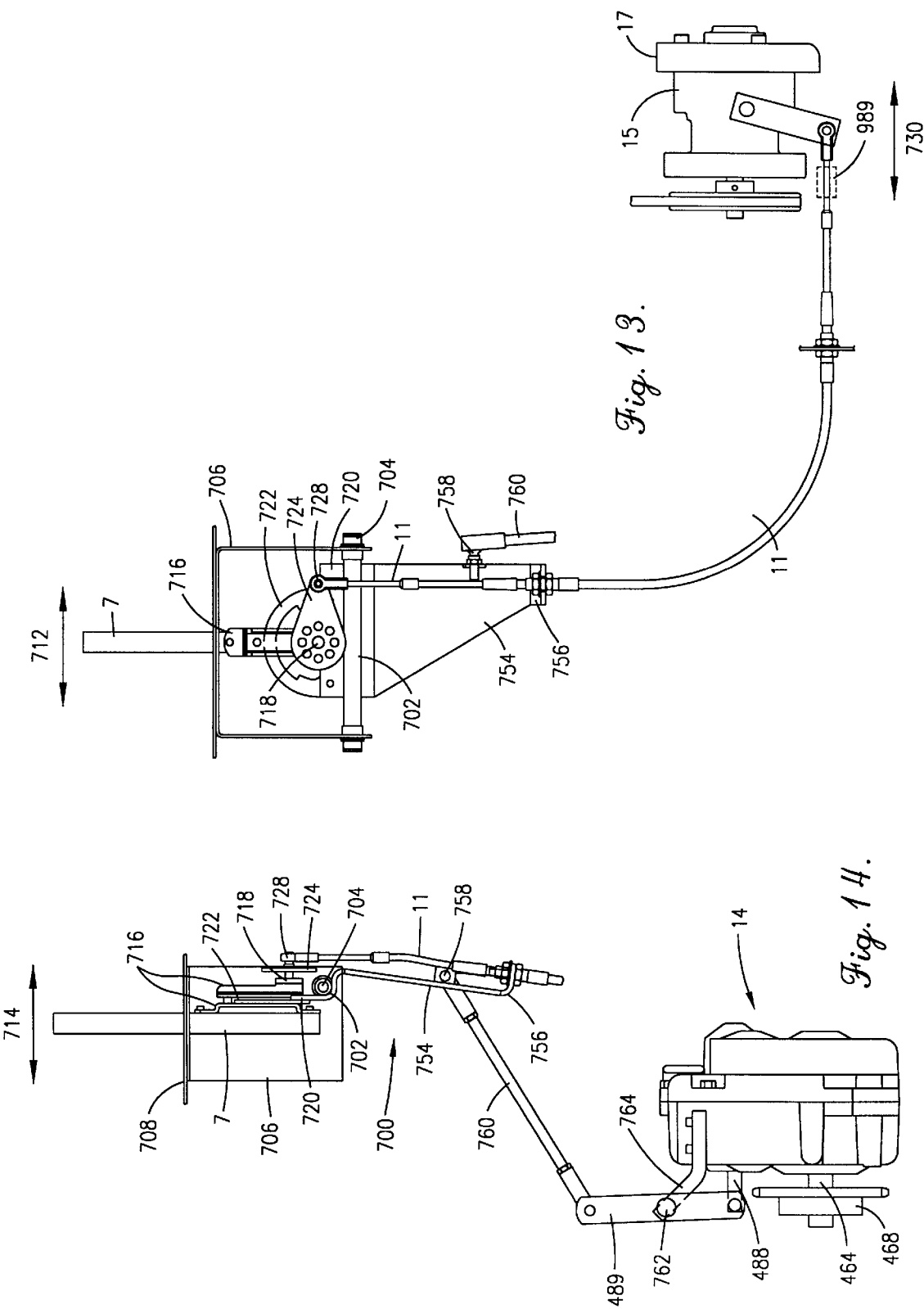

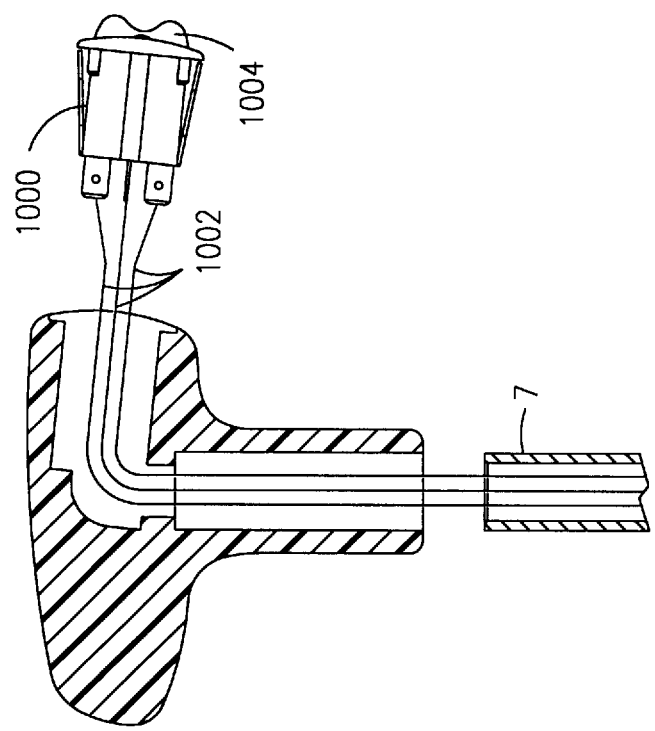
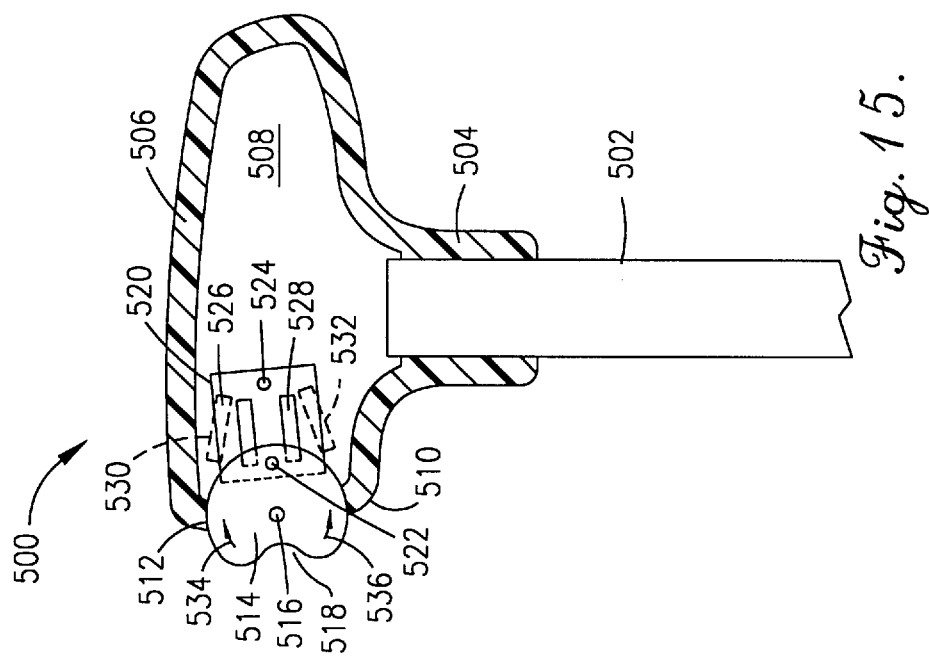

SELF PROPELLED SAW

This is a divisional of application Ser. No. 08/370,374, filed Jan. 9, 1995 now abandoned.

FIELD OF THE INVENTION

The present invention is related to a saw for cutting concrete, stone, asphalt and other similar surfaces, and in particular, to a self propelled saw utilizing an in-line engine arrangement with improved speed, performance and depth controls.

BACKGROUND OF THE INVENTION

The present invention is described below in connection with the concrete industry by way of example only but is equally useful in cutting other hard surfaces.

In the concrete industry, when building bridges, buildings, roads and the like, it is often necessary to pour large horizontal slabs of concrete. Once poured, it is desirable to machine the slab. Such machining may include cutting seams completely through the slab (to form expansion joints and to allow for foundation shifting), cutting notches partially into the slab (to create stress cracks along which the slab will split), cutting multiple grooves into the slab to create a high friction surface such as for bridges, grinding the surface of the slab and the like. Various types of concrete saws may be utilized to carry out these machining tasks. In larger industrial applications, large self propelled saws are used which are powered in a variety of manners, such as by gasoline, diesel, electric, propane, and natural gas engines mounted on the saw. While performing a cut, the operator walks behind the saw to control the direction, cutting speed, cutting depth and the like.

Self propelled concrete saws are mounted upon rear drive wheels and upon a hinged front axle assembly which hydraulically raises and lowers the front end of the saw. The front axle assembly includes a height adjustment cylinder that is attached to a front axle assembly having the front wheels thereon. The front axle assembly pivots downward away from, and upward toward, the saw frame when the cylinder extends and retracts thereby raising and lowering the saw. The saw blade is mounted upon a blade support shaft proximate the front of the saw, and thus as the front end is raised and lowered the cut depth is varied.

When cutting a notch partially into a slab, it is desirable to maintain the cut at an even and pre-set depth. Also, when cutting extremely deep notches or cutting through thick concrete, the concrete saw is unable to do so in a single pass. Hence, multiple passes are necessary within a single groove. Generally, it is desirable to remove an even portion of the concrete during each pass.

Self propelled concrete saws have been proposed which utilize a depth stop mechanism attached to the front axle assembly. The depth stop mechanism includes a threaded rod stem extending vertically between the front axle assembly and the control panel. The upper end of the rod stem includes a knob and the lower end is threadably secured within a linkage to the front axle assembly. The linkage dictates a depth to which the front axle assembly may lower the saw. As the operator screws the rod stem in one direction, the linkage is moved outward away from the frame to prevent the front axle assembly from collapsing against the frame, thereby setting the depth of cut.

The conventional mechanical depth stop mechanism has met with limited success since it requires the operator to turn the rod stem a plurality of times in either direction to adjust the cut depth. This operation is time consuming and undesirable (generally, the operator must rotate the rod stem 13 times to vary the cut depth by two inches). Additionally, the rod stem has proven unreliable and prone to fail since it fatigues and vibrates during operation until it brakes. Also, quite often the saw is dropped during loading and unloading and when being moved off of the edge of a slab of concrete. Jolting forces upon the front wheels are transmitted directly to the rod stem and, quite often, bend or break the rod stem. When the rod stem bends, it becomes difficult to turn and creates an unpredictable relation between the number of rod stem turns and the variation in the cut depth. Further, the rod stem is subjected to adverse weather conditions and often rusts, which also renders the rod stem difficult to turn.

Past concrete saws have further provided an indicator for measuring the depth of the cut. These systems displayed the approximate depth of the cut relative to a fixed reference point, namely the concrete surface. The depth indicator system includes a lever arm having one end attached to the front axle assembly and attached to a cable and pulley configuration which drives an indicator dial. The lever arm moves the cable about the pulleys, while the cable is tensioned by a spring. The pulleys rotate the indicator dial. However, this system has proven unreliable since the spring breaks and the cables slip upon the pulleys. This system further requires a direct path between the dial and the lever arm for the cable which further complicates the system design.

Conventional self propelled concrete saws include a gasoline, diesel, propane, or electric engine aligned along an axis transverse to the longitudinal axis of the saw frame. This transverse arrangement align the engine crankshaft parallel to the rotational axis of the saw blade, to afford an easy design for interconnecting pulleys upon the crankshaft and the saw blade.

However, this transverse engine alignment limits the physical size of the engine that can be practically used since the engine length is limited by a maximum acceptable width of the saw to allow the saw to pass through door opening (e.g. 36 inches).

Further, the driving engines are typically unbalanced between the front and the rear ends thereof (also referred to as the fan end and the drive end). Thus, the concrete saw receives an unbalanced engine load across its width. Additionally, some types of engines include a heavy drive end (proximate the crankshaft) while other types of engines include a heavy fan end (proximate the fan blade). Each concrete saw must be balanced and thus must be designed to compensate for the unbalanced engine load. Hence, concrete saws utilizing the first type of engine are unable to be used with the second type of engine and vise versa.

During a cutting operation, the concrete saw is supported by the rear wheels and the saw blade in a triangular support pattern. The saw blade and diagonally opposed rear wheel form a hypotenuse of the triangle support pattern. The saw tips across this hypotenuse in a direction dictated by the lateral position of the center of gravity. By way of example, when the blade is mounted on the right side of the saw and when an engine is used having a heavy drive end (proximate the left side), the saw tips across the hypotenuse of the support triangle toward the left side of the saw (away from the other supporting rear wheel). Divergently, when the blade is mounted on the right side and an engine is utilized having a heavy fan end, the saw tips across the hypotenuse toward the right side of the saw (toward the other supporting rear wheel). When the saw tips across this hypotenuse away from the supporting rear wheel, it bends the blade, induces side tension thereon and causes blade core cracking, all of which shorten the life of the blade. Thus, it is highly important to design the saw such that its lateral center of gravity is located upon the side of the triangle support pattern adjacent the rear wheels. Past systems have addressed this concern by including a torsion bar support system within the frame or by placing excess weight proximate the base of the triangle support pattern (i.e., proximate the rear wheel remotely located from the hypotenuse).

However, once the saw is balanced for a particular engine type and for a saw blade mounted on one side thereof, the saw is not easily modified to mount the blade on the opposite side. As noted above, the saw is balanced to locate the center of gravity on the side of the hypotenuse of the triangle support pattern proximate the saw blade and the rear wheels. Once the saw blade is moved to the opposite side, this modification chances the triangle support pattern, such that the hypotenuse thereof extends between the new position of the saw blade and the diagonally opposed rear wheel. However, moving the saw blade does not shift the center of gravity. Instead, the hypotenuse of the triangle support pattern shifts to the opposite side of the center of gravity such that the saw tips across the hypotenuse in a direction away from the supporting rear wheel. Hence, when the saw blade is moved to the opposite side of the saw, the saw becomes unbalanced and shortens the life of the blade due to side tensions, bending, cracking and the like. This unbalanced arrangement also causes the saw to cut crooked, causes the blade to wear unevenly and renders the saw more difficult to steer.

In addition, the foregoing balancing problem prevent the use of different types of engines upon the same saw frame. As explained above, switching the engine type similarly moves the center of gravity laterally across the saw and across the hypotenuse of the triangle support pattern. Thus, saws having transversely aligned engines operate optimally with a single type of engine and with the saw blade mounted on a predefined side. Any variation from this basic design renders the saw unbalanced and shortens the life thereof.

Further, the transverse engine alignment has prevented conventional saws from adequately isolating engine vibration from the saw blade. Engine vibrations, when transmitted to the saw blade, cause the blade to similarly vibrate which induces jolting, high intensity impact loads between the blade and the concrete surface. These impact loads cause the diamonds within the blade to break and chip, thereby shortening the blade life. In the past, engines have been mounted upon rubber mounting blocks in an attempt to isolate the engine from the concrete saw frame, and thus from the saw blade.

As noted above, the crankshaft projects from one side of the concrete saw. Pulleys are provided upon the outer end of the crankshaft and upon the saw blade supporting shaft. Once the belts are tightened, a substantial bending force is induced upon the drive end of the crankshaft and upon the end of the blade supporting shaft proximate the pulley. This bending force, in combination with the unbalanced engine weight, necessitates the use of extremely rigid engine mounting blocks proximate the drive end of the engine and the belt and pulley assembly. As the hardness of the mounting blocks increases, the block's ability to suppress vibrations decreases. Thus, the hard blocks afford little vibration suppression. Hence, the unbalanced loading of the engine across the width of the saw prevents the proper type of mounting blocks to be used which would effectively isolating engine vibrations from the saw blade.

The effectiveness of mounting blocks in this unbalanced environment is further reduced by the fact that the belt and pulley assembly induces a substantial bending force upon the drive end of the crankshaft. This bending force creates an unbalanced force upon the mounting blocks, whereby the mounting blocks experience vibrations in a substantially shear direction (i.e., across the width of the blocks). Mounting blocks operate optimally when vibration forces are directed directly into the block (in a compression direction) and are not designed to suppress vibrations induced in a lateral or shear direction.

The bending effect upon the crankshaft further reduces the life of the engine. Generally, engines are designed with light shell type bearings to support the crankshaft. These shell type bearings are not designed to, nor capable of, withstanding substantial side loads (i.e., loading forces in a direction transverse to the rotational axis of the crankshaft) over a substantial period of time. Hence, conventional saws required the use of engines containing specially designed bearings intended to withstand such side loads. Alternatively, when engines are utilized with light shell type bearings, an additional bearing assembly must be added proximate the drive pulleys to afford supplemental support against side loading. These conventional systems have proven undesirable since they increase the system cost and complexity. Moreover, conventional engines have experienced reduced life since the bearings therein fail prematurely.

Further, the life of the pulley and belt arrangement is further reduced by the fact that the belts bend the crankshaft and blade support shaft until the pulleys run unevenly. This uneven alignment causes the inner most belt to be tighter than the outermost belt, thereby causing uneven wear upon the belts. By unevenly loading the belts, the conventional belt and pulley arrangements were less efficient in transferring engine power to the blade shaft.

As the number of belts increases, the uneven loading therebetween similarly increases and thus the conventional belt and pulley arrangement was limited in the number of belts to be used.

Concrete saws mount the saw blade support shaft within rotary bearings located on the bottom of the saw frame. These bearings are subjected to harsh operating conditions since they are constantly subjected to concrete and water slurry emitted from the cut. Past support bearings have been unable to seal adequately the bearing from the environment. Past concrete saws have been unable to shelter these support bearings from the slurry concrete composition which wears upon the bearing seals and causes failures. These bearing systems require daily lubrication to purge contaminants. However, even with daily lubrication, these bearings have a very limited life. The life of the bearings is further reduced by the uneven loading created by the belt-pulley arrangement located on one end of the blade support shaft.

In the past, concrete saws have been proposed which utilize a gear box proximate the saw blade and along one side of the frame adjacent the transversely aligned engine. Conventional gear boxes include an output shaft which directly engages the saw blade. However, these conventional gear box designs position the gear box immediately adjacent and surrounding the rotational axis of the saw blade. Thus, the gear box, if formed too large, interferes with the available cut depth since the gear box housing contacts the concrete surface if the saw is completely lowered. To avoid such interference, the gear box is maintained small or replaced with a pulley.

However, as the gear box is reduced in size, it is less capable of dissipating heat and becomes easily overheated. To reduce the temperature within the gear box, water cooled gear boxes have been proposed. Water cooled gear boxes circulate water through a water to oil heat exchanger. However, the oil within the gear box still experiences extreme temperatures as it passes through the gears. In fact, the lubricant within the gears may flash to a temperature as high as 270° at the point of contact with the gears, even though the remainder of the oil reservoir is cooled to approximately 180°. When the oil lubricant flashes to this extremely high temperature, it's chemical composition breaks down thereby reducing the life of the gear box.

Further, it is often desirable to perform a dry cutting operation in which no separate water source is necessary for spraying water onto the blade (water is used during wet cutting to cool the blade and to remove the concrete particles from the cut). Dry cutting is desirable to avoid the water lines and extra slurry processing equipment utilized in a wet cutting operation. However, the reduced equipment advantage is obviated when a water cooled gear box is utilized since a water reservoir and water lines must be used with the gear box.

Concrete saw engines also experience overheating since the engine is either air cooled or when cooled with a radiator that is located along one side of the saw frame and exposed to adverse operating conditions which tend to plug up the radiator.

Past saws also provide the opening to the fuel tank at an intermediate point along the tank. Generally, when fuel is added, the saw is in a raised position thereby tilting the fuel tank such that the opening is at an intermediate height within the tank. Thus, fuel tended to slosh out once filled. Also, conventional fuel tanks draw fuel from the tank, via an opening in the bottom of the tank, through a fitting and hose. Thus, when the fitting or hose leak, the tank is drained. Utilizing an opening in the bottom of the tank also draws foreign material from the tank with the fuel.

Further, conventional fuel systems utilize a gauge located within the fuel cap of the tank. The gauge included a dial connected to a stem extending into the tank and having a float on its lower end. The stem rotated the fuel gauge depending upon the position of the float. However, a hole was required within the cap between the fuel tank and the gauge to admit the stem. Fuel tended to splash into the gauge about the stem. In addition, air was allowed into the fuel tank about the stem.

Conventional concrete saws utilize a mechanical governor for controlling the RPMS (revolutions per minute) of the engine and the saw blade. Every type of saw blade operates at a different optimal rotational speed. The optimal speed for a given blade is achieved by adjusting the governor to direct the engine to rotate at a corresponding speed. Mechanical governors are generally controlled by some form of biasing force, such as afforded by a spring, to control the governor. The biasing force is adjusted to adjust the engine's operating speed. Hence, the biasing force controlling the governor is changed each time the type of blade is changed to one with a differing optimal rotational speed. These changes were cumbersome and time consuming.

Further, mechanical governors are easily tampered with by operators during use since the mechanical governor is readily accessible to the operator. Normally, the governor is set to operate the engine at an optimal RPM level for a given blade type and size. While manufacturers or distributors set the governor to achieve the optimal RPM level, operators often adjust the governor setting to increase the engine's operating speed (and thus the blade speed). However, these operator adjustments can exceed the optimal RPM level for the particular blade, thereby "over speeding the blade" and shortening the blade life. Overspeeding the blade also places the saw in an unsafe operating condition. The risk of overspeeding a blade is further complicated by the fact that most concrete saws are designed to operate with a plurality of blade sizes and thus are capable of rotating at extremely high speeds. Operator tampering with the governor can also cause the engine to run at an unsafe RPM level.

To convert between different blade sizes, the engine speed must be adjusted, along with the belt and pulley ratio between the engine and the saw blade. In the past, the necessary adjustments were quite difficult and required multiple saw components to be changed. Further, previous belt and pulley arrangements afforded little speed reduction between the saw blade speed and the engine RPM level. Thus, the engine RPM level was set at the optimal RPM level of the saw blade. Generally, the blade's optimal RPM level is below the engine's optimal RPM level (i.e., the RPM level at which the engine generates a maximum horsepower). Thus, the engine rotates slower than its optimal RPM level and at a reduced horsepower.

Conventional concrete saws were unable to operate at an optimal engine speed since the pulley arrangement offered little or no gear reduction between the saw blade and the engine. The driven pulley is provided upon the saw blade support shaft proximate the saw blade. As the saw blade pulley increases in diameter, it interferes with, and reduces, the available cut depth. To maximize the available cut depth, small pulleys are provided upon the blade shaft, thereby limiting gear reduction between the engine and the blade.

Conventional saws are difficult to re-configured to reverse the rotational direction of the saw blade. The blade's rotational direction is reversed between downward cuts (i.e., with normal concrete cutting or notching operations) and upward cuts (i.e., to clean out a cut or notch and to perform grooving and grinding operations). Cuts are cleaned to remove any excess cutting material before adding a silicon or rubber based material, such as a elastomer, to form an expansion joint (i.e. allow for expansion and contraction due to weather changes). Grooving and grinding operations use an upward cut since the saw utilizes a stack of saw blades arranged side by side. These blades have a tendency, when rotated in a downward direction, to drag or pull the saw forward faster than desired. To prevent such dragging, the blades are rotated in an upward direction, thereby creating a rearward force pushing the saw backward. Self propelled concrete saws include driving wheels that push groovers or grinders forward at a desired rate.

Further, conventional saws having a transverse alignment are limited in the amount of power transferable between the engine crankshaft and the blade support shaft. As noted above, saws are limited in width in order to pass through standard doors. Conventional saws attach the drive pulleys to the crankshaft and thus the drive pulleys extend beyond the drive end of the engine. The number of pulleys are limited by the width of the saw. The number of pulleys and belts dictate the amount of power which is transferable between the crankshaft and the saw blade. The number of pulleys useful with the engine is limited by the saw width, and thus the power transferable to the saw blade is similarly limited.

Further, conventional saws utilize a drive mechanism for moving the saw which affords a single gear ratio. The drive mechanism utilizes a variable speed hydrostatic pump and motor which is adjustable in rotational speed and rotational direction. The hydrostat is attached, via gears and a chain to the drive wheels. This conventional drive mechanism afforded the operator a single operating range dependent upon the gear combination between the drive wheel and the motor.

Often, it is desirable to drive the saw at a low ground speed, such as when effecting deep cuts, wherein the ground speed is adjustable in extremely small increments. At other times, it is desirable to drive the saw at a high ground speed, such as when effecting shallow cuts or moving between cuts.

The conventional drive mechanism afforded a single operating range for the ground speed. Pence, when the operator desired to change between low and high ground speeds, the operator must change the gears or sprockets upon one or both of the drive motor and drive wheels. By changing these sprockets, the operator was able to change the gear ratio and thus the ground speed range. This mechanical change was time consuming and undesirable.

In addition, the conventional drive mechanism maintained an engaged relation between the drive wheels and the drive motor at all times. The drive motor rotated in forward and reverse directions and afforded a locked or stopped position. Thus, the saw was unmovable by the operator when the engine was turned off.

Moreover, the conventional saw utilized multiple control levers including separate levers to raise and lower the saw, move the saw forward and backward, and to drive and stop the saw. These control levers were difficult to use.

Finally, conventional saw offered little operator comfort since the saw was extremely noisy and transferred substantial vibrations to the operator through the control levers and handle bars. Conventional saws were particularly noisy since the transversely aligned engine directed the air and noise from the engine to one side which effectively surrounded the operator.

A need remains within the industry for an improved concrete saw. It is an object of the present invention to meet this need and to overcome the disadvantages experienced heretofore.

SUMMARY OF THE INVENTION

According to the present invention, a concrete saw is provided characterized by an engine mounted with its longitudinal axis extending parallel and in-line with the longitudinal axis of the concrete saw. This in-line configuration is arranged such that the crankshaft extends substantially along the central axis of the saw frame and parallel to the direction of the cut. The present in-line arrangement enables the use of larger engines, such as water cooled engines, since the length of the engine is not limited by the saw's width. Larger engines translate into more productive cutting, longer saw life, lower maintenance, less engine noise, lower emissions and greater fuel efficiency.

The engine speed is controlled by an electronic governor which maintains the engine speed at one of a plurality of desired constant speeds dictated by a speed selector switch set by the operator. These speeds may include an idle speed, a maneuvering speed, and multiple predetermined operating speeds. The electronic governor with the selector switch maintains a constant engine speed for any load up to a maximum load thereby providing a constant RPM speed (to maximize power, fuel efficiency and blade usage efficiency). The electronic governor further prevents tampering with the governor setting thereby eliminating overspeeding of the blade for greater safety.

The drive end of the crankshaft receive a drive assembly (which may include a clutch) and a right angle gear box directly thereon. The gear box is located remote from the saw blade and provides a double ended drive shaft extending from both ends thereof across a width of the saw. Both ends of the gear box shaft receive gear box pulleys equally loaded with an even number of belts that are attached to corresponding pulleys on opposite ends of the saw blade supporting shaft.

The present right angle gear box arrangement splits the drive load equally between both sides of the saw, thereby preventing induced bending loads on the crankshaft and thus extending the engine life, the bearing life, and the belt life. Equally, loading the belts also allows more pulleys and belts to be used to transfer the driving force from the engine to the saw blade since the inner and outer belts are evenly tensioned. These additional belts and pulleys maximize the transfer of engine power to the blade and increase cutting power. In addition, even belt tensioning affords longer belt life, engine life and bearing life, and consistent power output. The present gear box arrangement further provides the ability to reverse the rotational direction of the blade from a downward cut to an upward cut by simply rotating the gear box 180°.

The present gear box is located remote from the cutting environment and thus the gear box size does not interfere with the available cut depth. Hence, the present gear box is sufficiently large that it need not be water cooled. The gear box further provides for any desired amount of speed reduction thereby allowing the engine and the saw blade to rotate at different optimal speeds. By balancing the load in the foregoing manner, the in-line configuration allows the saw to cut equally well with blades mounted on either side thereof.

Opposite ends of the gear box output shaft include stainless steel tapered sections for receiving the pulleys. These tapered sections afford quick and easy pulley removal.

The gear box is mounted upon, and separated from the engine frame, via isolators. Opposite ends of the gear box are evenly loaded, and thus the vibration forces from the engine are directed directly into the isolators. Hence, these forces are effectively eliminated. By evenly distributing the load onto the isolators into direct compression less rigid isolators may be utilized which in turn more effectively suppress engine vibrations.

The present gear box and isolator arrangement prevents the transfer of vibrations to the frame and the saw blade which measurably lengthens the blade life, decreases component fatigue, reduces engine noise and provides greater operator comfort.

The operator's comfort is further enhanced by utilizing a soft molded handle for the control levers and by providing soft molded handle grips on the handle bars.

The saw blade support shaft is mounted, at opposite ends, to the frame through heavy duty bearings. A shield extends between the inner sides of the bearings to protect same from the environment. The outer sides of the bearings are located immediately adjacent pulleys which protect the bearings from dirt and concrete slurry. The pulleys evenly load the bearings. The bearing arrangement provides multiple seals between the bearings and the environment to lengthen the bearing life.

The present concrete saw includes a two-speed transmission with a neutral position attached to the rear drive wheels. The transmission is driven by a hydraulic motor which is supplied oil flow via a variable steed, reversible hydrostatic pump. A single control lever controls the two steed transmission and the hydrostatic pump's volummetric flow rate and direction of fluid flow. This heavy duty transmission arrangement provides longer transmission life and allows the operator to easily switch between high and low ranges (such as when cutting deep and shallow cuts) without changing the drive sprocket. The neutral position allows the operator to move the saw with the engine OFF. A neutral safety start switch is also provided which prevents the engine from being started unless the transmission is in neutral. A parking brake is provided to prevent the saw from moving if the transmission is left in neutral. Optionally, an indicator light is included to notify the operator when the transmission is in neutral.

A single control lever is provided whereby the hydrostatic pump is shifted from forward-to-stop-to-reverse as the control lever is moved between forward, middle and backward positions. The lever further shifts the transmission between high, neutral and low ranges when moved from side to side. Finally, the lever includes a momentary rocker switch thereon which raises and lowers the saw.

The present concrete saw includes a front axle assembly which is pivotally mounted at its rearward end to the saw frame. The forward or opposite end receives wheels to carry the front end of the concrete saw. The front axle assembly includes first and second cylinders attached thereto proximate its frame mounting pivot point. The first cylinder is controlled to rotate the axle assembly about its pivot point to raise and lower the saw. The second cylinder represents a hydraulic adjustable depth stop mechanism which prevents the front end of the saw blade from being lowered below a maximum cut depth. This hydraulic depth stop cylinder is controlled via a set/reset switch upon the saw control panel. The set/reset switch opens a normally closed valve which allows an amount of hydraulic fluid to be delivered to and captured within the depth stop cylinder. During operation, the operator opens the valve and adjusts the saw height, via the lifting cylinder, to a desired height. Once this valve is closed, the depth stop cylinder will allow the saw to be raised, but not lowered below the set depth.

The inventive saw further uses an electronic depth indicator which identifies the cut depth relative to a variable or resetable reference point. The depth indicator is attached to a potentiometer connected to the front axle assembly. The potentiometer changes its resistive reading as the front axle assembly rotates. The depth indicator measures this resistance and indicates a corresponding depth. Once the user sets the depth stop mechanism at its desired depth, the user similarly resets the depth indicator by "zeroing" the sensor (via a second potentiometer) when the blade touches the cutting surface.

The depth indicator may be tied to the transmission or hydrostatic pump to slow the saw speed when the cut depth begins to decrease. Often, when the saw begins to move to fast, the depth of the cut decreases. The depth indicator senses this depth variation and slows the transmission. Once the saw's speed is reduced sufficiently, the saw blade returns to the desired cut depth.

The present concrete saw is further characterized by a mid-mounted radiator on the fan end of the engine remote from the cutting area. A crankshaft mounted fan allows a low straight through air flow which reduces the overall saw height. The fan is aligned to draw air from the back end of the saw toward the engine and blow hot air away from the operator. This arrangement further centers the weight of the radiator upon the frame and draws clean cool air through the radiator. The radiator includes wide fin spacing to pass dust easily. The fan is provided with nylon reinforced blades which minimize the effects of vibrations from the engine transferred through the crankshaft. This nylon blade allows a crankshaft mounted fan whereas past systems mounted the fan on the water pump to avoid such vibration. A foam mat is provided over the in-take side of the radiator to collect dust and particulate material drawn therethrough. The foam mat is provided with a hydrolyt activant therein which collects water from the air to retain more effectively particulate material. The mat is simply removed and easily cleaned, thereby removing the need to wash the fins within the radiator, such as with a high pressure washer thereby reducing the risk of bending the radiator fins. This separate filtering mat enhances the radiators life and effectiveness. In addition, an engine shroud or cowling is provided about the engine to enclose same. The engine shroud or cowling reduces engine noise and includes vents through its forwardmost face. The fan directs hot air forward through the vents in the front end of the engine cowling away from the operator, thereby reducing noise.

Optionally, a shroud may be provided along the bottom of the frame making a line transverse thereto and located at a point there along to prevent air circulation from the front of the saw back under the saw and up through the radiator.

A single hydraulic reservoir is used for the lifting assembly and the hydrostatic unit for lower maintenance and greater reliability. A replaceable spin-on filter is provided to collect particulate material within the hydraulic fluid.

The present concrete saw further includes a top mounted fuel pickup system, reducing the likelihood of the fuel draining from the tank if the hose breaks. The fill cap to the fuel tank is located at the forwardmost and highest point upon the fuel tank to prevent fuel spillage and leakage when the saw is raised. The fuel tank is contoured with a ramped bottom side to maximize air flow and capacity to the radiator.

An engine cowling is included to reduce engine noise and protect the engine from the environment.

Electronic engine gauges are included for greater reliability, less leakage and lower maintenance. An isolated handle bar system is provided with paddled handles to reduce vibrations for greater operator comfort. Replaceable locking collars are used to provide adjustable handle bars. A circuit breaker panel is provided for protecting the electrical components from overloading. A battery acid drip tray is included about the battery to protect the frame and the paint from corrosion. Side cable battery mounts are provided for greater safety and better cable connections.

BRIEF DESCRIPTION OF THE DRAWINGS

The objects and features of the invention noted above are explained in more detail with reference to the drawings, in which like reference numerals denote like elements, and in which:

FIG. 3 illustrates a front elevational view of the concrete saw of FIG. 1;

FIG. 6 illustrates a side sectional view of an isolator and mounting bracket for supporting the right angle gear box taken along line 6—6 in FIG. 3;

FIG. 13 illustrates a side elevational view of the control assembly connecting the control lever with the hydrostatic pump;

FIG. 14 illustrates an end elevational view, as viewed from the rear of the saw, of the control assembly connecting the control lever with the transmission;

FIG. 15 illustrates a side elevational view of one embodiment of the control lever with a blade height control switch; and FIG. 16 illustrates an exploded view of an alternative embodiment of the control lever with a blade height control switch.

DETAILED DESCRIPTION OF THE INVENTION

Figure 1:
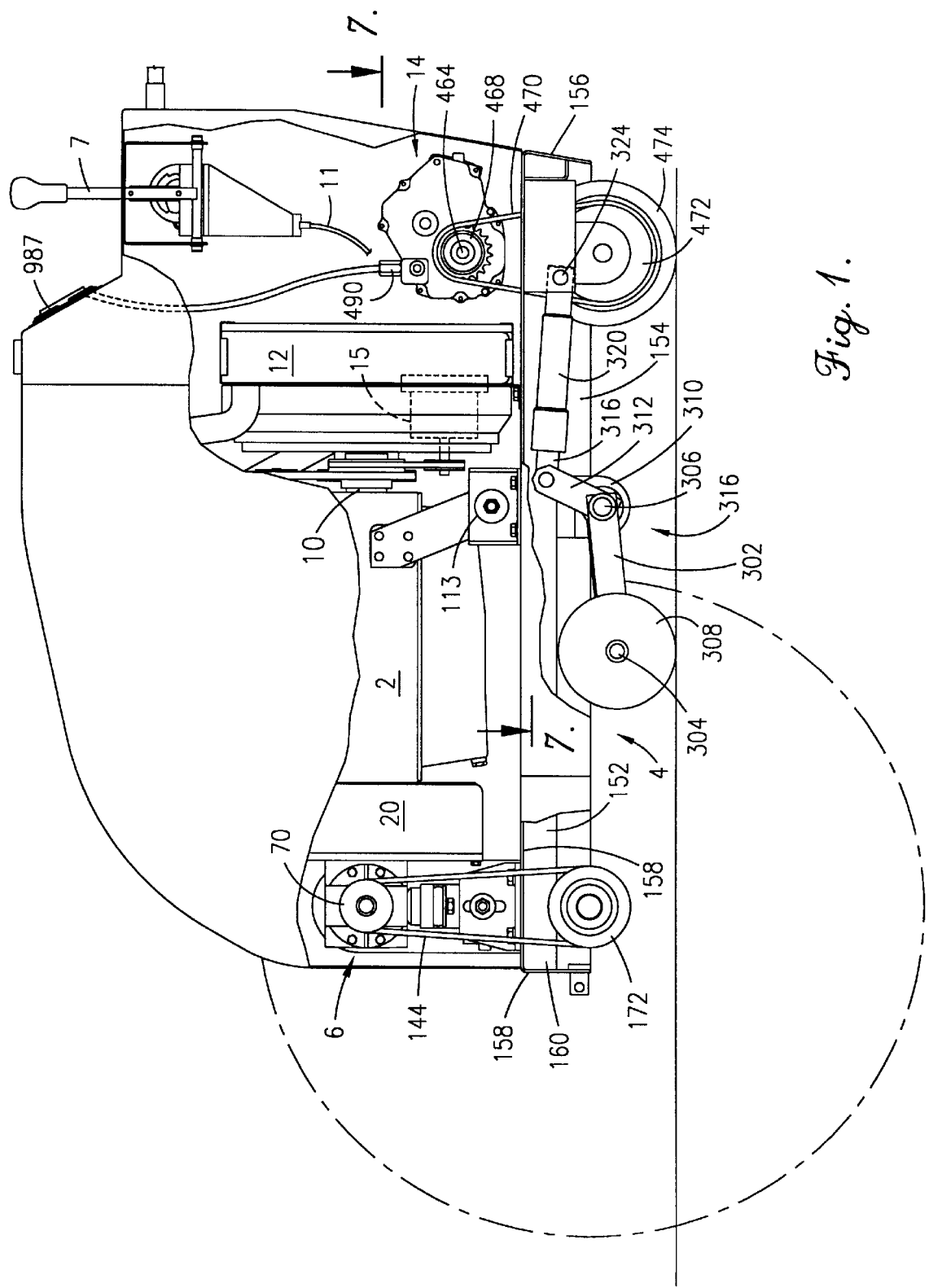
FIG. 1 illustrates a side elevational view of a concrete saw according to the present invention while in a lowered position.
Figure 7:
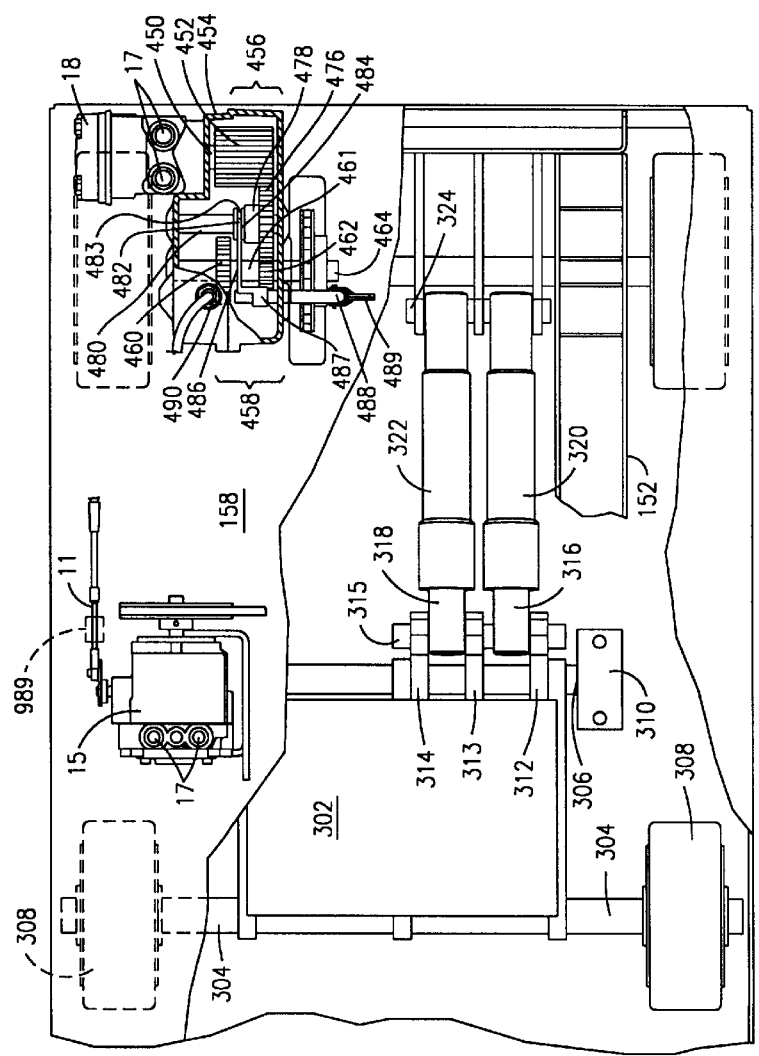
FIG. 7 illustrates a top plan view of the front axle assembly with the lifting and depth stop assembly, along with a top sectional view of the transmission, taken along line 7—7 in FIG. 1.

FIG. 1 generally illustrates a concrete saw according to the present invention having an engine 2 mounted to and extending along the longitudinal axis of a saw frame 4. The drive end of the crankshaft driveably receives a drive plate assembly 20 mounted directly thereto and upon a drive end of the engine 2. A gear assembly 6 is mounted on the outer end of the drive plate assembly 20. The gear assembly 6 provides a right angle power coupling for driving a saw blade, the outline of which is generally shown in dashed lines. A fan end of the engine 2 driveably receives a fan blade directly mounted on the opposite end 10 of the crankshaft. The fan blade (not shown) is positioned proximate the radiator 12 for cooling the engine 2. A multi-sized transmission 14 is mounted on the rear end of the frame 4 in driving engagement with the drive wheels 474 via a chain 470. The transmission 14 is driven by a hydraulic motor 18 (FIG. 7) which is powered by a hydrostatic pump 15 (FIG. 7). A depth control assembly 16 is mounted on the lower side of the frame 4 to control the depth of a cut effected by the saw blade. A control handle 7 and control handle linkage 9 control the hydrostatic pump 15 (FIG. 7), transmission 14 and depth control assembly 16. The remaining sections and subsections of the inventive saw will be described in more detail below in connection with the corresponding drawings.

Figure 4:
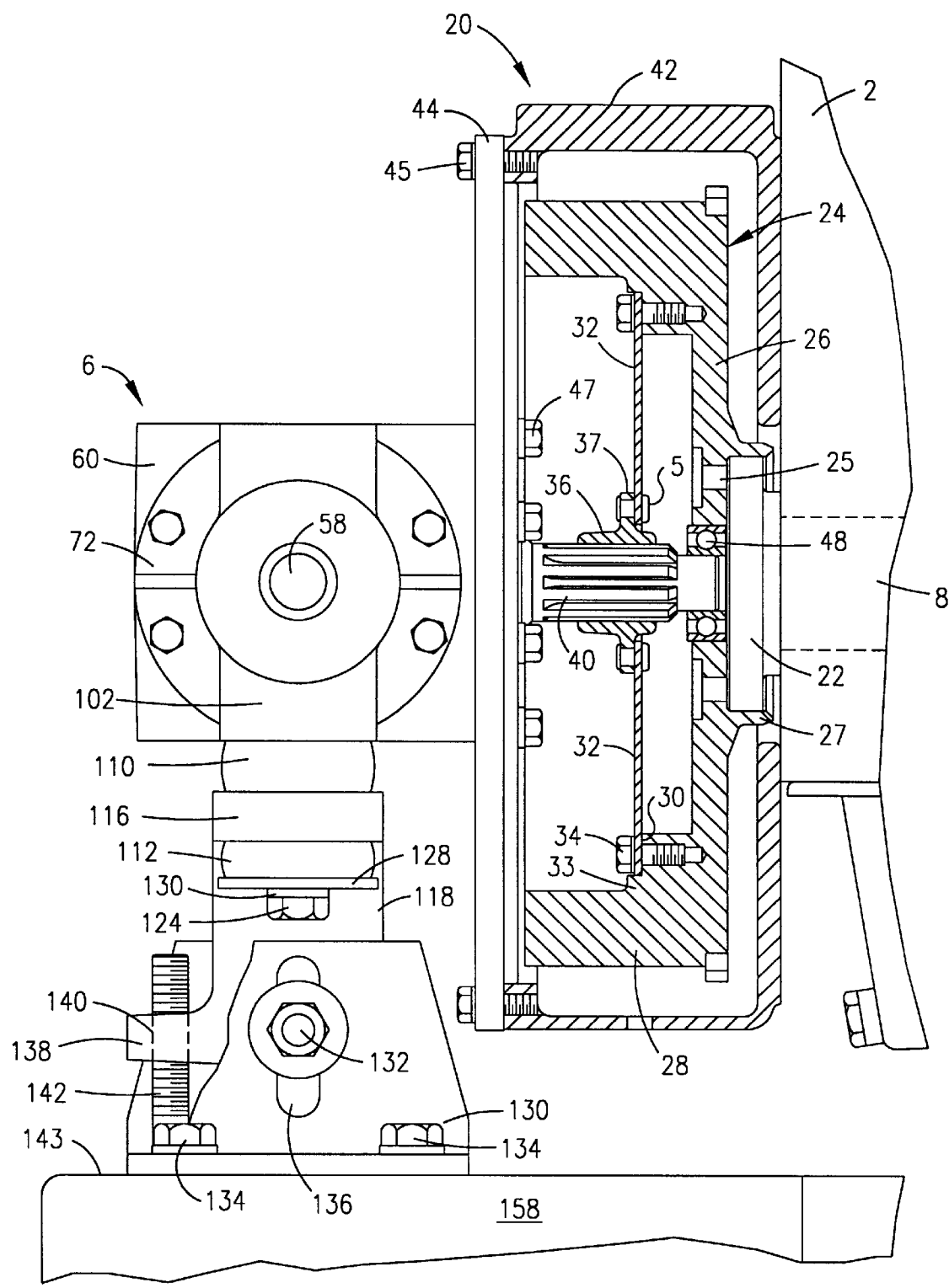
FIG. 4 illustrates a side view of the forward end of the present saw with of portion thereof broken away to illustrate the drive assembly.

Turning to FIG. 4, the gear assembly 6 and the drive plate assembly 20 securely mounted to the drive end of the engine 2 are described in more detail. The drive plate assembly 20 includes a flywheel housing 42 securely mounted to the face of the engine along one side and securely receiving a gear box plate 44, via bolts 45 along the opposite outer face. The gear box plate 44 is securely bolted to the gear box housing 46 via bolts 47. A crankshaft 8 is provided including a flange 22, mounted on it's outer end, which rotates with the crankshaft 8 during operation. The flange 22 extends into the flywheel housing 42. A flywheel 24 is bolted to the flange 22 at points 25. The flywheel 24 serves to balance the engine when in operation. The flywheel 24 includes a flat base 26 having a lip 27 extending from a backside thereof, to securely receive the flange 22. The base 26 includes an outer rim 28 formed with a stair-stepped cross-section. The flywheel 24 affords the necessary inertial weight to balance rotation of the engine. The rim 28 includes a ledge 30 at an intermediate step there about to receive a drive plate 32 securely bolted thereto. The ledge 30 includes an outer face 33 extending outward therefrom to fit snugly against the drive plate 32.

The drive plate 32 is mounted to the flywheel 24 via bolts 34. The drive plate 32 includes a hole through the center thereof which receives a drive plate splined coupling 36 partially extending therethrough. The coupling 36 includes a flange 37 about it's periphery having holes therethrough to receive rivets 5 which secure the flange 37 to the drive plate 32. The coupling 36 includes a plurality of splines about it's inner periphery and extending transverse thereto. The splines slidably receive a splined shaft 40 from the gear box 6. The splined connection provides a direct driving connection between the gear assembly 6 and the flywheel 24. This splined connection affords linear motion between the gear assembly 6 and the engine 2 to prevent the transfer of linear loading directly along the rotational axis of the splined shaft 40.

A pilot bearing 48 is received within a recess in the front of the flywheel 24. The pilot bearing 48 receives a smooth forwardmost end of the splined shaft 40 to centrally locate the splined shaft within the flywheel 24 and carries any side load of the splined shaft 40. The gear box plate 44 mounts the gear box 6 to the engine.

Figure 5:
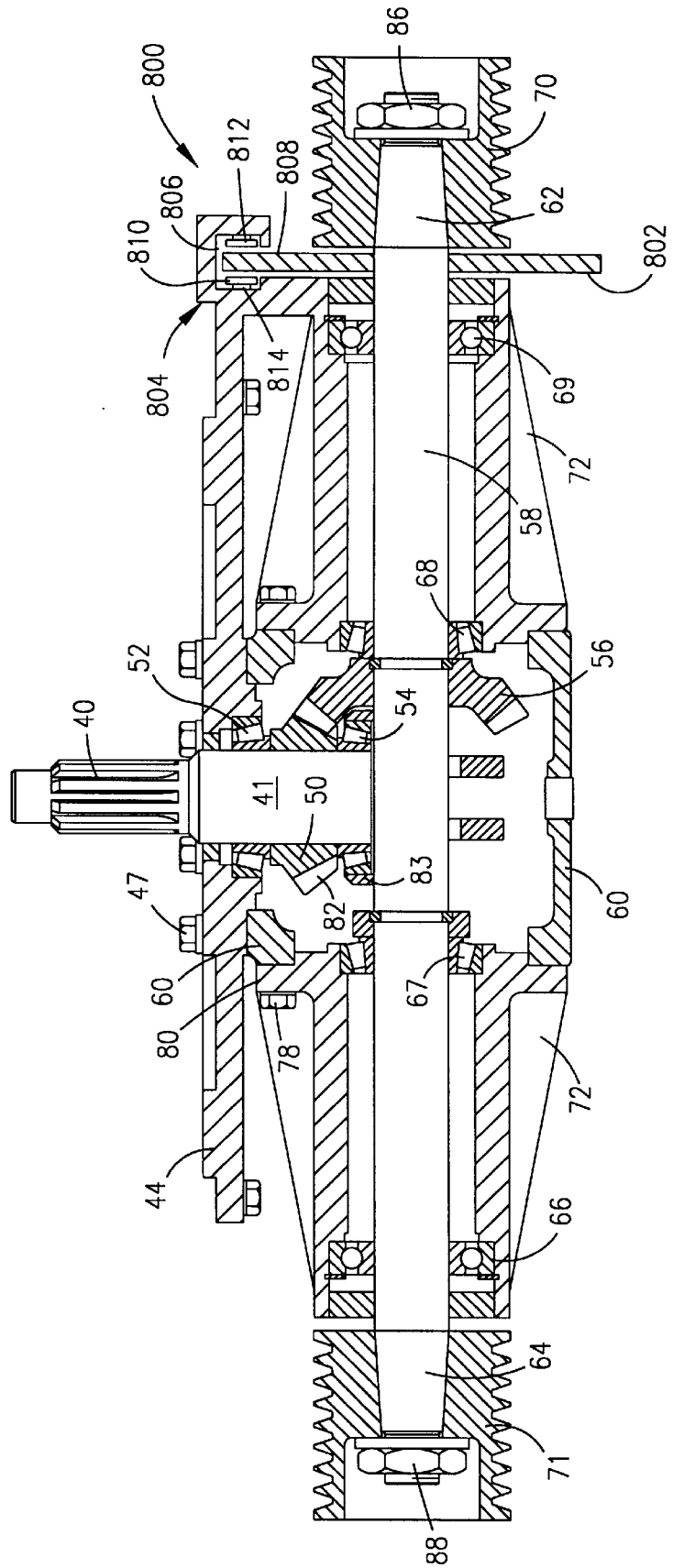
FIG. 5 illustrates a top sectional view of a right angle gear box of a concrete saw according to the present invention.

Turning to FIG. 5, the internal workings of the gear assembly 6 are explained in detail in connection therewith. The gear assembly 6 includes a gear box housing 60 having openings through opposite sides and the face thereof. The gear box housing 60 securely receives tapered support extensions 72 on opposite sides thereof. The splined shaft 40 includes a forward or outer end 41 which is received within a spiral beveled pinion gear 50. Support bearings 52 and 54 are located about the outer end 41 of the splined shaft 40 and upon opposite sides of the pinion gear 50. The pinion gear 50 driveably engages a second spiral beveled gear 56 arranged at a right angle to the pinion gear 50. The second gear 56 is fixably mounted upon a driven shaft 58 which extends through the sides of the gear box 60 and through the support extensions 72. The spiral beveled pinion gears 50 and 56 afford a right angle transfer of the engine's rotational force between the splined shaft 40 and the driven shaft 58. The spiral beveled design enables a right angle transfer of a large driving force at high speed while minimizing noise.

The driven shaft 58 extends outward in both directions from opposite sides of the gear box housing 60 and includes tapered sections 62 and 64 on opposite ends thereof. The driven shaft 58 is formed of a corrosion resistant high tensile strength material, such as stainless steel. The driven shaft 58 is rotatably mounted within bearings 66–69 seated within journaled recesses along the support extensions 72. The tapered ends 62 and 64 afford easy removal and installation of gear box pulleys 70 and 71. When removing gear box pulleys 70 and 71, the user merely need "pop" the pulleys 70 and 71 loose from the tapered ends 62 and 64 of the shaft 58. Thereafter, the pulleys 70 and 71 easily fall off of the driven shaft 58. The sides of the gear box housing 60 are mounted with bolts 78 to the support extensions 72 and the force of the housing 60 mounted to a rear face to the gear box plate 44 with the bolts 47.

The gear box enables an amount of gear reduction to be achieved between the motor speed and the rotary speed of the driven shaft 58 by adjusting the diameters of the pinion gears 56 and 52. By providing optional gear reduction, the gear box is able to maintain the engine at its optimal RPM level i.e., such as 3000–3500 RPM while allowing the saw blade to rotate at an optional blade speed.

The gear assembly 6 affords a mechanism for easily reversing the rotational direction of the saw blade. To do so the gear box plate 44 (FIG. 4) is simply detached and rotated by 180 degrees. In particular, to reverse the rotational direction of the saw blade, the gear box plate 44 is released from the flywheel housing 42 by removing the bolts 45. The belts are also removed. As the gear box plate 44 is removed, the splined shaft 40 slidably disengages the coupling 36. The gear box housing 60 is rotated 180 degrees about the rotational axis of the splined shaft 40 to reverse the direction of rotation of the driven shaft 58. The gear box plate 44 is remounted such that the splined shaft 40 is again engaged within the coupling 36. The bolts 45 are reinserted.

By rotating the gear box in this manner, an operator is able to convert between a down cutting operation and an up cutting operation.

Turning to FIG. 3, the support extensions 72 include upper and lower supporting flanges 100 and 102, respectively, located at opposite ends thereof. The upper and lower support flanges 100 and 102 are located diametrically opposite one another at respective ends of the housing. The support flanges 100 and 102 include threaded recesses for receiving mounting bolts 104. While the upper and lower support flanges 100 and 102 mirror one another, only the support flanges directed downward are utilized at any given time. The upper support flanges 100 are provided for use when the gear box 60 is rotated 180 degrees about the rotational axis of the spline shaft 40 (FIG. 4). Upper and lower isolators 110 and 112 are provided to effectively isolate vibrations within the engine and the gear box from the frame 4. The gear assembly 6 is mounted, via the isolators 110 and 112, upon a rear engine support 114 having cuter arms 116 extending in opposite directions and legs 118 directed downward.

As illustrated in more detail in FIG. 6, the arm 116 of the engine support 114 is sandwiched between the upper and lower isolators 110 and 112. The upper isolator 110 is further compressed between the arm 116 and the lower support flange 102. The upper isolator 110 includes an integral isolator collar 120. The isolator collar 120 include a hole therethrough to receive a sleeve 126 about the bolt 124. Optionally, the lower isolator 112 may be formed with the collar or both isolators 110 and 112 may include concentrically formed isolators. Similar variations may be utilized so long as the isolators 110 and 112 provide a complete and continuous barrier of flexible resilient material between the arm 116 and the bolt 124 and the supporting flange 102. The bolt 124 is received within the tubular sleeve 126 which extends through the holes in the upper and lower isolators 110 and 112. The sleeve 126 extends from the flange 102 to the flat washer 128. A lock washer 130 is provided proximate the head of the bolt 124 to resist loosening thereof. The isolators 110 and 112 are made of a flexible resilient material to absorb vibrations induced thereon by the engine support 114 and the gear box 60. In this manner, the isolators 110 and 112 prevent the transfer of vibrational forces between the flanges 102 and the arms 116. The sleeve 126 provides a rigid core whereby the bolt 124 is tightened against the flat washer 128 at one end and against the flange 102 at the opposite end. Isolators are also used at the fan end of the engine between the engine and the frame.

Returning to FIG. 3, the engine support 114 is bolted to the frame 4, via L-shaped brackets 130 and bolts 132 and 134. As illustrated in FIG. 4, the legs 118 include holes therethrough aligned along a vertical axis. The L-shaped brackets 130 include elongated slots 136 which align with the holes to afford a passageway to receive the supporting bolts 132. The engine support 114 further includes forwardly projecting ledges 138 on opposite sides thereof. The ledges 138 have threaded holes 140 therethrough. The holes 140 threadably receive bolts 142. The bolts 142 may have heads on the upper or lower ends so long as the bolts 142 firmly abut against the upper surface of the frame 4. The bolts 142, by threadably engaging the ledges 138, function to tighten the belts and as safety stops to prevent the engine support 114 from being lowered below a minimum desired height. To adjust the tension in the belts 144 and 146, the bolts 132 (FIG. 3) are loosened to allow linear movement between the legs 118 and the vertical portion of the L-shaped brackets 130. The vertical support bolts 142 are turned to span the distance between the ledges 138 and the upper surface 143 of the frame 4. Once the heads of the bolts 142 engage the frame 4, they lift the engine support 114. Moving the engine support 114 in this manner moves the pulleys 70 and 71 similarly and along a vertical path to tighten and loosen the belts 144 and 146. Once the belts 144 and 146 are sufficiently tightened, the holding bolts 132 are tightened to prevent further movement between the engine support 114 and the frame 4.

A balanced tension force is maintained upon opposite sides of the gear box 60 by evenly adjusting the bolts 142, thereby evenly loading the gear box pulleys 70 and 71. By maintaining this balanced force, the load is directed evenly downward along opposite sides of the gear box 60 in a direction parallel to the longitudinal axis of the belts 144 and 146. This loading force is evenly applied to the isolators 110 and 112, thereby applying compression loads directly along the longitudinal axes 148 and 150 (FIG. 3) of the isolators 110 and 112 and minimizing the shear forces applied thereto. Thus, the isolators 110 and 112 need not be designed of a material sufficiently rigid to withstand excess shear forces. Isolators afford an increased vibration dampening characteristic as the rigidity thereof is decreased. By using even loading the dampening ability of the isolator system is enhanced.

With reference to FIGS. 1 and 7, the frame 4 is constructed from a pair of longitudinally extending channel members 152 secured at opposite ends and at intermediate points to transverse support brackets 156. Top sides of the longitudinal members 152 and 154 and the support brackets 156 receive a flat mounting shell 158. The front corners of the shell 158 (FIG. 1) includes recesses 160 extending along opposite sides of the channel members 152. The recesses 160 provide an operating region for the belts 144 and 146, and the saw blade pulleys 172 and 174.

Turning to FIG. 3, the lower sides of the forward most ends of the channel members 152 securely receive blade shaft mounting bearings 166. The mounting bearings 166 include flat upper surfaces with threaded holes that abut against the channel members 152. Bolts 134 extend through the brackets 130 and channel members 152 and are fixedly bolted to the bearings 166. Each bearing 166 includes a housing about sealed bearings 181. Inner seals 183 are surrounded with grease 185. Inner and outer caps 165 and 167 are mounted to the housing via bolts. The inner and outer caps 165 and 167 are rotatably joined, via flexible seals 168 with a saw blade drive shaft 175. The blade shaft 175 is constructed of stainless steel material and includes outer portions extending beyond opposite ends of the outer caps 167. The outer most portions of the blade shaft 175 extend beyond the bearings 166 and include key grooves 170 extending longitudinally along the outer surface thereof. The outer sections of the blade shaft 175 receive driven pulleys 172 and 174. The pulleys 172 and 174 are maintained upon the blade shaft 168 via tapered locking hubs 187. The inner caps 165 are enclosed within opposite ends of a flexible shield 178 and secured thereto, such as with a hose clamp (not shown). The shield 178 prevents exposure of the inner sealed ends of the bearings to contaminates produced during a cut. The shield 178 further prevents a user's clothing from being wrapped around the blade shaft 168. The shield 178 is formed of semi-resilient material to maintain its form when in use.

The outer seals within the outer seal flanges 167 are partially protected from environment contaminants by the pulleys 172 and 174 even though a slight air gap is formed therebetween. The pulleys 172 and 174 create a "slinging effect" during operation which tends to prevent the contaminates from collecting proximate the seals within the outer caps 167. Thus, the pulleys 172 and 174 and shield 178 protect and lengthen the life of the bearing seals.

Figure 9:
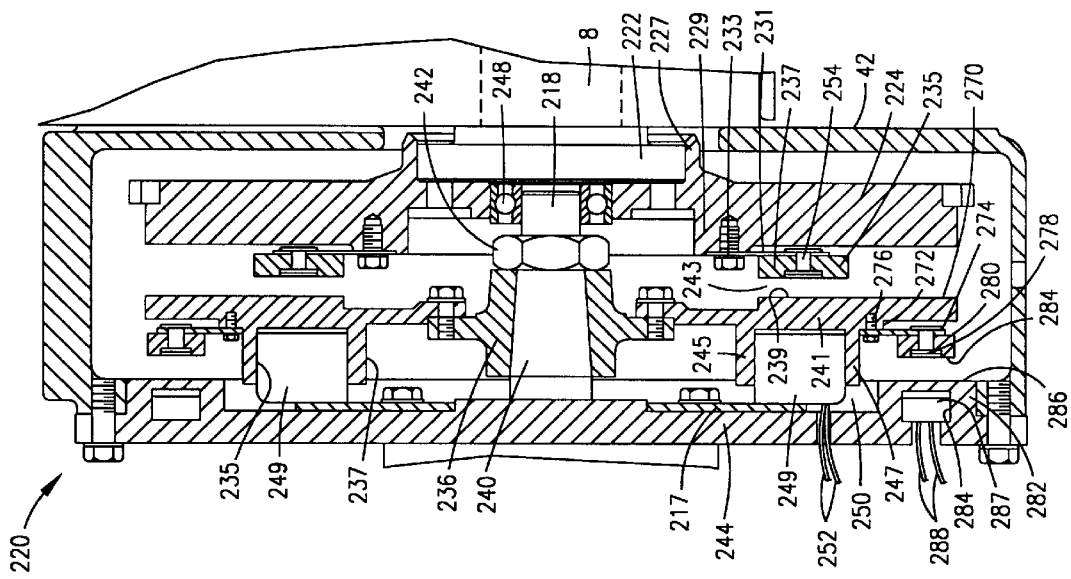
FIG. 9 illustrates a side sectional view of an electronic clutch assembly which may be used in an alternative embodiment of the present invention.

Turning to FIG. 9, an alternative embodiment for the drive plate assembly 20 is illustrated wherein an electronic clutch is utilized. The electronic clutch 220 includes a housing 42 which is securely mounted to the end of the engine with the crankshaft 8 extending into and through an opening in the front face thereof. The crankshaft 8 includes a flange 222 on its outer end which is bolted to a backside of the flywheel 224 within a circular lip 227. In this alternative embodiment, the flywheel 224 is constructed somewhat different in that it includes a flat outer or front face having a slightly raised circular ridge 229 located concentrically thereabout proximate a center portion of the flywheel 224. The circular ridge 229 receives flat springs 231 extending radially outward there from and mounted via bolts 233. The outer ends of the springs 231 are mounted securely to an armature disk 235 forming a ring having an inner circumference concentrically extending about the outer circumference of the circular ridges 229. The armature disk 235 includes an armature engaging face 237 directed away from the flywheel 224 and aligned immediately adjacent a corresponding rotor engaging face 239 upon a rotor disk 241. Rivet recesses 254 are provided within the armature disk 235 for securing the springs 231 to the disk 235. When disengaged, an air gap 243 is provided between the engaging faces 237 and 239.

The armature disk 235 is mounted to the flywheel 224 via the springs 231 to maintain a fixed rotary position therebetween. However, the flat springs 231 allow a longitudinal movement between the flywheel 224 and the steel armature disk 235 in a direction parallel to the rotational axis of the flywheel. This longitudinal movement allows the armature disk 235 to close an air gap 243 when the armature and rotor engaging faces 237 and 239 are magnetically drawn against one another. The flat springs 231 normally bias the armature disk 235 away from the rotor disk 241 to maintain the air gap 243 between the engaging faces 237, 239 while disposed in these remote positions, the armature and rotor disks 235, 241 are allowed to rotate relative to one another.

The rotor disk 241 is securely mounted upon a drive plate coupling 236 extending along the core and through the center of the rotor disk 241. The coupling 236 is securely mounted upon a gear box input shaft 240 via a nut 242. Optionally, a splined shaft and coupling may be used as in FIG. 4 or a straight shaft with a key way and the like. An outer journaled end portion 218 of the input shaft 240 is securely received within a pilot bearing 248 which rotatably centers the input shaft 240 relative to the flywheel 224. The pilot bearing 248 is received within a journaled recess proximate the center of the flywheel 224.

The rotor disk 241 includes concentric raised inner and outer rings 245 and 247 located on the back side thereof and spaced a distance apart. The inner and outer rings 245 and 247 receive a field coil 249 having a rectangular cross-section therebetween. The rings 245 and 247 maintain an extremely close tolerance with the field coil 249. The field coil 249 is securely mounted upon the gear plate box 244 with a mounting ring 217 interposed therebetween. A hole through the gear box plate 244 admits a power cable 252 to supply current to the field coil 249. The power cable 252 is connected with a battery and with a switch located upon the control panel of the saw. The switch affords the user the ability to turn the field coil 249 on and off when turned between first and second positions. Optionally, the switch may engage a braking mechanism once the clutch is disengaged when turned to a third position.

As the user selectively applies power to the field coil, the electronic clutch assembly 220 is engaged and disengaged.

In particular, when no current is applied to the field coil 249, the armature disk 235 is biased, via the flat springs 231 to a position proximate the flywheel 224 (as shown in FIG. 9) and remote from the rotor disk 241. When in this normally biased position, an air gap 243 is provided between the armature and rotor disks 235, 241. At this time, the flywheel 224, which is driven by the crankshaft 8, rotates freely without driving the gear box input shaft 240. The user engages the saw blade by turning on the control switch, thereby energizing the field coil 249. Once energized, the field coil 249 induces a magnetic field through the rotor disk 241 which draws the steel armature disk 235 against the rotor disk 241. Once these faces are frictionally engaged, the rotor disk 241 is driveably rotated by the armature disk 235, thereby similarly driving the input shaft 240 and the saw blade.

While the embodiment of FIG. 9 illustrates an input shaft 240 which is securely mounted to the coupling 236 via a nut 242, the electronic clutch assembly 220 may similarly be implemented utilizing the splined configuration illustrated in FIG. 3.

Optionally, a blade brake may be provided in combination with the electronic clutch to afford means to halt rotation of the saw blade once the clutch is disengaged. The blade brake may be included within the electronic clutch housing 242, within the gear box housing 60 or along the blade shaft 168.

For instance, as shown in FIG. 9, the electronic brake may be provided about the outer periphery of the rotor disk 241 by including an extension rim 270 about the rotor disk 241 and integrally formed therewith. The extension rim 270 includes an inner lip 272 which securely receives a second flat spring 274. The spring 274 is attached to the lip 272 via bolts 276. The outer ends of the spring 274 are secured, via rivets 278, to a second armature disk 280. The gear box plate 244 includes a raised outer rim 282 forming a second rotor disk. The raised outer rim 282 and the armature disk 280 include engaging faces 284 and 286 which frictionally engage one another to resist further rotation of the rotor disk 241. The raised rim 282 includes a hollowed recess 284 therein which receives a second field coil 287 having control cables 288. The control cables 288 are attached to the same switch used to control the electronic clutch. When the user turns the switch to a position which disengages the field coil 249 and engages the field coil 286, the field coil 249 releases the armature disk 235 while the field coil 286 attracts the armature disk 280. Thus, the rotor disk 241 disengages the armature disk 235 while the armature disk 280 engages the outer rim 282. In this manner, a brake is implemented.

Alternatively, a disk brake assembly may be provided along the gear box driven shaft 58 or along the blade shaft 168. As illustrated in FIG. 5, the disk brake assembly 800 may be located proximate the outer end of the driven shaft 58. The disk brake assembly 800 includes a disk brake 802 securely mounted upon the driven shaft 58 and located proximate the tapered end 62 thereof. The disk 802 extends about the driven shaft 58 between the pulley 70 and the outer end of the support extension 72. A brake housing 804 is located upon the outer end of the gear box plate 44 and includes a recessed chamber 806 therein, along with a slot 808 to receive the disk 802. The recessed chamber 806 includes inner and outer brake pads 810 and 812 located immediately adjacent and upon opposite sides of the disk 802. The brake pads are movably mounted to the housing 804 via pad actuators 814. The actuators 814 may comprise electronic actuators powered by a 12 volt remote source and connected to a brake switch located upon the control panel.

The actuators 814 may be constructed to extend when energized by the switch upon the control panel. When so energized, the actuators drive the brake pads 810 and 812 against opposite sides of the disk 802 to establish a frictional engagement therebetween. The switch controlling the disk brake may be included within a three way switch, wherein the switch engages the electronic clutch when in a first position, disengages the electronic clutch within a second position and engages the disk brake when in a third position.

Optionally, disk brakes may be provided upon both ends of the driven shaft 58.

As a further alternative, the brake assembly may include mechanical springs to normally bias brake pads into a frictionally engaging relation with the driven shaft 58 or blade shaft 168. When so engaged, the brake pads would prevent rotation of the engaged shaft. The brake assembly would further include a disengaging actuator, such as an electric, magnetic, pneumatic or hydraulic actuator to physically contract the mechanical springs and disengage the brake pad from the corresponding shaft. For instance, if an electronic actuator is utilized, when the user turns the control switch to engage the electronic clutch, the electronic disengaging brake actuator would forcibly disengage the brake pads from the corresponding shaft. The electronic actuator would maintain the brake pads in this disengaged position until the user turned the control switch to release the electronic clutch. When the clutch is released, the electronic actuator similarly releases the disk brake, thereby allowing the mechanical spring to automatically bias the brake pad against the driven shaft 58 or blade shaft 168. This in turn automatically halts rotation of the saw blade. Alternatively, the blade brake assembly may be controlled from a separate switch provided to the user.

In addition, the electronic clutch assembly is controlled such that the operator is only able to engage the clutch when the speed selector switch is set at one of the slower engine speeds (i.e., an idle speed or a maneuver speed). This assembly prevents the operator from engaging the clutch when the engine is running at the higher cutting speeds, thereby rendering a safer system. This safety feature may be implemented in a variety of ways. For instance, the clutch engaging switch may be connected in series with a flywheel rotational speed detector. The flywheel detector will only enter a closed circuit state, thereby connecting the electronic clutch switch with the electronic clutch, when the flywheel is rotating below a maximum safety threshold (i.e., below an engine cutting speed). Alternatively, the electronic clutch may be connected to the micro-controller 950 (FIG. 12) and controlled thereby, such that the electronic clutch switch only energizes the field coil within the electronic clutch when the micro-controller 950 determines that the speed selection switch 606 is in one of the lower speed settings (i.e., in the idle speed setting or the maneuver speed setting). As a further option, a series of relays may be installed between the electronic clutch switch and the field coil of the electronic clutch. These relays may be attached to the leads 953 and 951 to provide a close circuit between the electronic clutch switch and the electronic clutch when the leads 951 and 953 indicate that the speed selection switch 606 is set in one of the first and second positions (i.e., in an idle position or a maneuver position).

Figure 2:
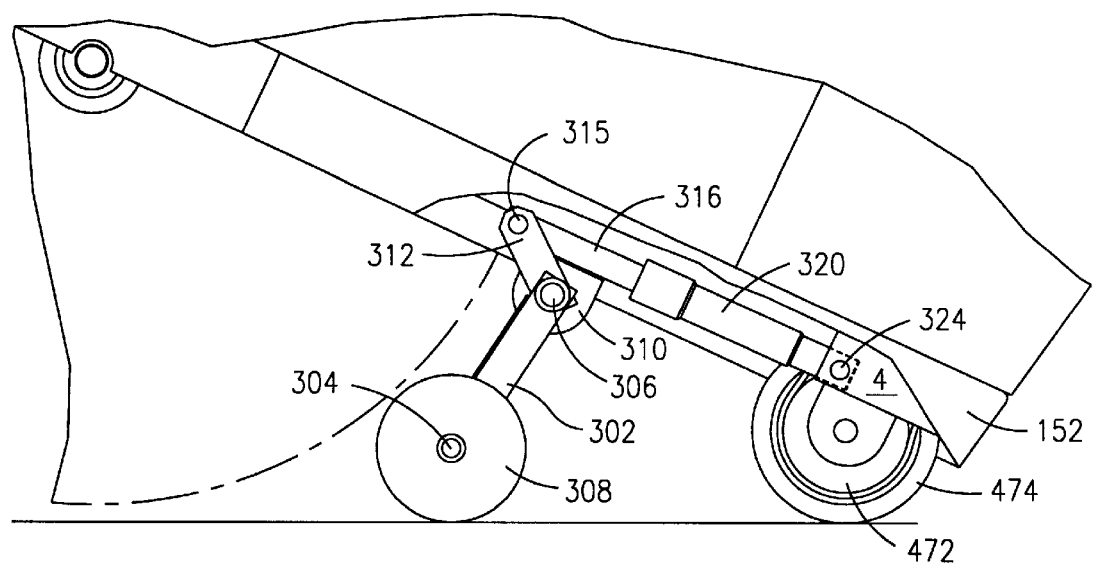
FIG. 2 illustrates a side elevational view of a lower portion of the concrete saw of FIG. 1 while in a raised position.

Turning to FIGS. 1, 2 and 7, the lifting and depth stop mechanism is explained in more detail. The lifting and depth stop mechanism 16 includes a front axle assembly 302 formed as a rectangular shaped channel having front and rear pivot pins 304 and 306 extending from opposite sides thereof and positioned proximate front and rear ends thereof. The front pivot pins 304 rotatably support wheels 308 which support the forward end of the concrete saw. The rear pivot pins 306 are rotatably mounted within bearings 310 securely bolted to the lower side of the frame 4. The bearings 310 are located at an intermediate point along the frame 4 to position the wheels 308 forward of the center of gravity of the concrete saw.

The front axle assembly 302 further includes push brackets 312–314 mounted between the rear pivot pins 306 and extending radially outward from the rotational axis defined by the rear pins 306. The push brackets 312–314 are arranged to extend upward at an obtuse angle to the plane formed by the surface of the front axle assembly 302. The push brackets 312–314 are pivotally mounted via rod 315 to lifting rams 316 and 318 of cylinders 320 and 322, respectively. The hydraulic cylinders 320 and 322 include rearward ends mounted to the frame 4 via a pivot pin 324. The hydraulic cylinders 320 and 322 are powered by a hydraulic pump remotely located therefrom.

The hydraulic cylinder 320 operates to lift the saw. The hydraulic cylinder 322 functions as a depth stop mechanism to set a maximum depth of a cut by the saw blade. When the hydraulic cylinder 320 extends, the ram 316 drives the push brackets 312–314 forward, thereby causing the front axle assembly 302 to rotate about the pivotal axis formed along the rear pivot pins 306. As the front axle assembly 302 rotates about the rear pivot pins 306, the wheels 308 are driven downward, thereby lifting the front end of the concrete saw (FIG. 2). Divergently, when the cylinder 320 is contracted, the front axle assembly 302 rotates in an opposite direction to lower the front end of the concrete saw (FIG. 1). The depth stop cylinder 322 is controllably set to capture a set amount of fluid, thereby defining a predefined maximum cut depth.

Figure 8:
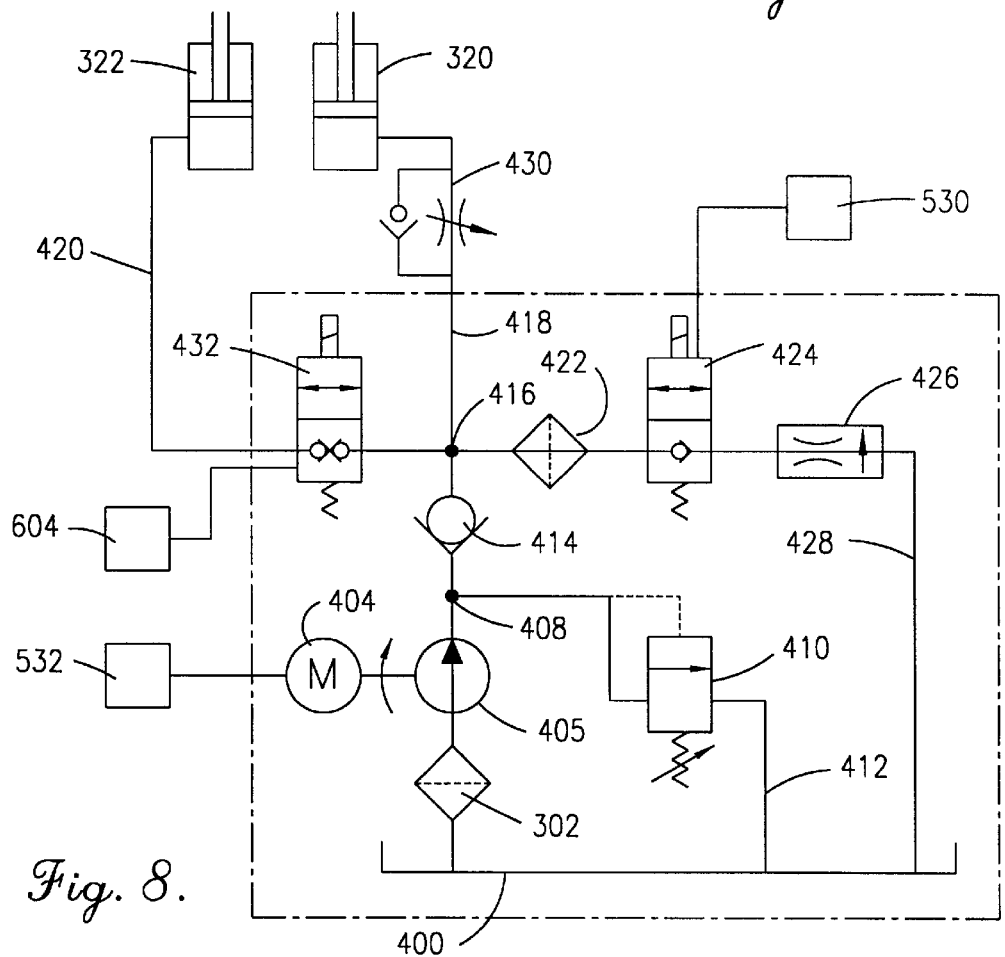
FIG. 8 illustrates a schematic diagram of the hydraulic system utilized to control the lifting and depth stop assembly of FIG. 7.

Turning to FIG. 8, a schematic of the hydraulic system utilized to control the lifting and stop assemblies is described hereafter. An oil reservoir is generally illustrated at point 400 which supplies hydraulic fluid to a hydraulic pump 405 via a filter or strainer 302. The pump 405 is driven by a DC motor 404 which is controlled by an electronic rocker switch located upon the control lever 7 (FIG. 1). This switch includes an energizing plate generally designated by the reference numeral 532. The pump 405 outputs fluid to a node 408 which communicates with a control valve 410. The control valve 410 may be set at any desired level such as approximately 2600 psi, wherein it opens when the pressure at node 408 exceeds the preset level. When the fluid pressure exceeds the valve 410 preset level, the hydraulic fluid is returned to the reservoir 400 via the return line 412. From node 408, the hydraulic fluid is delivered to a check valve 414 which operates as a one way valve to deliver hydraulic fluid to its discharge side and not allow reverse direction hydraulic fluid flow.

Fluid from the check valve 414 flows through node 416 from which separate hydraulic lines 418 and 420 deliver fluid to the lifting cylinder 320 and the depth stop cylinder 322, respectively. The node 416 further connects with a second strainer or filter 422 which in turn connects with a normally closed solenoid control valve 424 and a flow control safety 426. The flow control safety 426 dictates a maximum flow rate wherein fluid may be returned, via line 428 to the reservoir 400.

The control valve 424 is normally closed until energized by a contact plate 530 within the rocker switch 514 on the control lever. When energized, it allows oil to flow along the return line 428. During operation, when the operator rotates the rocker switch to a lifting position, the switch 514 energizes the contact 532 and activates the motor 404 to drive the pump 405, thereby delivering hydraulic fluid to the lifting cylinder 320 via supply line 418. When the operator desires to lower the saw, the rocker switch 514 is toggled in an opposite direction (i.e. to a lowering state) whereat a contact plate 530 is energized and the normally closed control valve 424 is opened. When open, the control valve 424 allows hydraulic fluid to be discharged from the cylinder 320 and returned to the reservoir 400. A second flow rate control valve 430 is provided within the hydraulic line 418 to set the maximum flow rate with which hydraulic fluid is discharged from the lifting cylinder 320. The flow rate control valve 430 is variably adjusted by the operator to change the flow rate, thereby changing the rate at which the saw is lowered. The safety flow rate control valve 426 dictates a maximum rate at which the cylinder 320 may be collapsed, thereby setting the maximum lowering rate.

Returning to node 416, a second normally closed solenoid control valve 432 is provided within hydraulic line 420 to control the flow of fluid to the depth stop cylinder 322. The second normally closed solenoid control valve 432 is controlled via a depth stop set/reset switch 604 located upon the control panel.

Figure 10:
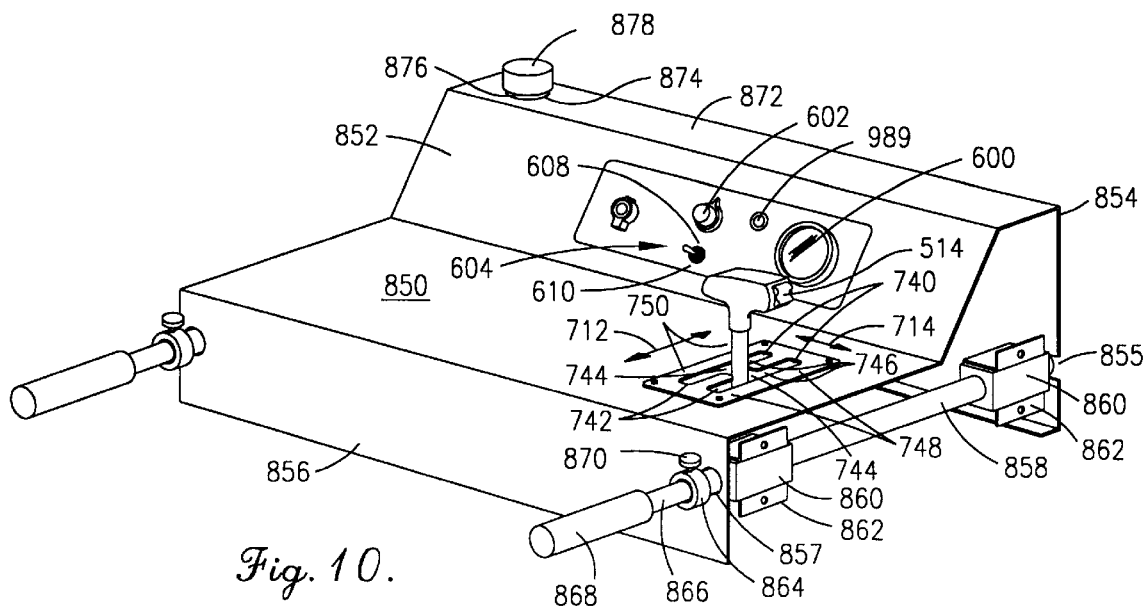
FIG. 10 illustrates a perspective view of the control panel with a side plate removed therefrom to expose a handle bar assembly.

As illustrated in FIG. 10, the depth stop control switch 604 includes a set state 608 and a reset state 610. When in the set state, the control switch 604 maintains the solenoid control valve 432 in a non-energized state (i.e., in a closed state). Thus, when in the set position, the control switch 604 prevents the flow of fluid to the depth stop cylinder 322. Divergently, when the control switch 604 is set in the reset position, it energizes the control valve 432 thereby allowing the flow of fluid along line 420 to and from the depth stop cylinder 322.

During operation, when a user desires to adjust the height of the saw and set the depth stop mechanism at a new height, the operator turns the depth stop control switch 604 to its reset position, thereby energizing the control valve 432 and allowing fluid to flow to and from the cylinder 322. Next, the operator uses the rocker switch 514 upon the control handle to raise and lower the saw, via the cylinder 320. Once a desired height is reached, the operator toggles the control switch 604 to the set position, thereby closing the valve 432 and capturing a predefined amount of fluid within the cylinder 322. When in this state, the ram within the cylinder 322 may extend, however, it may not retract beyond a length dictated by the amount of fluid captured therein. By capturing fluid in the cylinder 322, the valve 432 sets the maximum depth of cut.

Returning to FIG. 7, the transmission 14 is driven by a hydraulic motor 18 that receives fluid from a hydrostatic pump 15 via hydraulic lines connected between ports 17.

In the preferred embodiment, the motor 18 rotatably drives a two-speed transmission 14 at a variable rate in forward and reverse directions. The drive direction and speed of the motor 18 are determined by the fluid flow rate and direction from the pump 15. The pump 15 represents a variable displacement pump, the volummetric displacement of which varies as a swash plate control lever upon the pump 15 is moved. The fluid flow direction from the pump 15 is also controlled by the swash plate.

A control cable 11 is connected, at one end, to the swash plate to adjust the position thereof, and thus control the fluid flow rate and direction. The opposite end of the control cable 11 is connected to the lever 7. A linkage rod 13 connects the transmission 14 and the control lever 7. As explained below in more detail, movement of the control lever 7 along a first path (e.g., forward and backward) causes movement of the control cable 11, thereby changing the fluid flow rate and direction of the pump 15. Thus, backward and forward movement of the control lever 7 varies the rotational speed and direction of the motor 18 and the saw's ground speed. As explained below, movement of the control lever 7 along a second path (e.g., side to side) causes movement of the linkage rod 13, thereby shifting the transmission between high, neutral and low gear ratios. Thus, by moving the lever 7 side to side, the operator is able to change the range of ground speeds.

FIG. 7 illustrates the transmission 14 in more detail. The transmission 14 is driven by the hydraulic motor 18 via a splined output shaft 450 which is driveably received within a splined recess in a pinion gear 452. The motor 18 is securely mounted to the transmission housing 454. The pinion gear 452 is constructed in a tubular shape with a splined interior and a gear toothed exterior and received within the housing 454. The transmission 14 further includes a cluster gear assembly 456 and an output gear assembly 458. The output gear assembly includes large and small gears 460 and 462 separated by a spacer 461 and securely mounted on an output shaft 464 which is rotatably supported within bearings (not shown). The bearings are supported within journaled recesses in the transmission housing 454. The output shaft 464 extends through a hole in the transmission housing to receive a drive gear 468 (FIG. 1) on the outside thereof. The drive gear 468 engages a chain 470 (FIG. 1) which is securely received about a wheel gear 472 located proximate the drive wheels 474 at the rear end of the frame.

The cluster gear assembly 456 (FIG. 7) includes large and small gears 476 and 478 securely mounted immediately adjacent to one another in an abutting relationship. The cluster gear assembly 456 is rotatably received upon a cluster gear shaft 480 such that the cluster gear assembly 456 is rotatable about the cluster gear shaft 480 and slidable along the rotational axis thereof. The cluster gear assembly 456 further includes a flared end member 482 proximate one end thereof to form a groove 483 which receives a half moon shaped end 484 located on the outer end of a shifting fork 486. The shifting fork 486 is constructed in an L shape with the shifting end 484 on one end thereof and with a housing 487 on the opposite end thereof for secure engagement with a journaled outer end of a shifting shaft 488.

The shifting shaft 488 is securely mounted, via an intermediate toggle arm 489, to the lower end of the linkage rod 13 that is slidably controlled by the lever 9. When the user moves the lever 9 in a transverse direction, the linkage rod 13 is slid along its longitudinal axis thereby pivoting the toggle arm 489 about its center pivot point. As the arm 489 pivots, it drives the shifting shaft 488 along it's longitudinal axis. As the shaft 488 slides in this manner, it similarly moves, via the shifting fork 486, the cluster gear 456 along it's rotational axis and along the cluster shaft 480. As the cluster gear 456 slides along it's rotational axis, it shifts between low and high ranges. While in a low range, the smaller cluster gear 478 is positioned to driveably engage the larger output gear 460. While in the high range, the cluster gear is positioned such that the larger cluster gear 476 driveably engages the smaller output gear 462. The larger cluster gear 476 maintains driving engagement with the pinion gear 452 throughout operation regardless of it axial position along the cluster shaft 480.

The transmission 14 also includes a neutral position at which the cluster gear assembly 456 and the output gear assembly 458 are disengaged from one another. The shifting fork 486 shifts the cluster gear assembly 456 to a neutral state when the gears 476 and 478 are located between and, disengaged from, the gears 462 and 460.

The transmission 14 further includes a neutral safety switch 490 which senses the position of the shifting fork 486 and delivers a corresponding electronic signal to the starting switch. This signal indicates when the cluster gear assembly 456 is engaged with the output gear assembly 458. The neutral safety switch 490 creates an open circuit state within the electrical loop between the starter switch and the starter when the gears are engaged. This open circuit state prevents the starter from being actuated while the transmission 14 is in gear. The neutral safety switch 490 creates a closed circuit state between the starter and starter switch when the transmission 14 is in a neutral state.

The transmission 14 affords the user greater flexibility with respect to the speed at which the concrete saw is to be moved. For instance, when the operator is performing a deep cut, or a grooving or grinding operation, the transmission 14 may be placed in it's low range, while the pump 15 affords fine tuning adjustment of the saw's speed. Once the operator completes a cut and desires to move the saw to the next cut, the operator may shift the transmission 14 into it's high range while maintaining control of the saw's speed via the hydrostatic pump 15.

Optionally, the transmission 14 may be implemented using a single speed transmission with a neutral and safety start switch. When a single speed transmission with a neutral is utilized, the control handle configuration is simplified to allow for linear movement of the control handle along a single direction. As the control lever 7 is moved along the single direction, the control cable 11 connected thereto controls the hydrostatic pump 15 as explained above. A transmission may further be included which offers more than two speeds, such as a three or four speed transmission, provided that transmission includes a neutral and a safety start switch. When a multi-speed transmission is utilized, the control panel configuration simply need be modified to allow for side to side movement of the control lever 7 along a path sufficient to shift between these gears.

It is to be understood that if a multi-speed transmission is utilized (such as a five speed transmission), the control handle assembly may be modified to provide for shifting of the gears between such positions.

FIG. 15 illustrates a side sectional view of the control lever 7 which contains an electronic height control switch (also referred to as a rocker switch) generally designated by the reference numeral 500. The control lever 7 includes a stem 502 with an upper end securely mounted within the base 504 of the handle grip 506. The handle grim 506 includes a recessed chamber 508 therein which communicates with the front face 510 of the handle grip 506 via an opening 512. The chamber 508 and opening 512 partially receive a rocker switch 514 which projects through the opening 512 and beyond the face 510. The rocker switch 514 is mounted upon a pivot pin 516 which is secured, at opposite ends, to the handle grip 506. The rocker switch 514 includes a substantially circular cross-section with a V-shaped notch 518 cut in the outwardmost section thereof. The rocker switch 514 is hingeably mounted to a contact support plate 520 at point 522 located radially outward from its central pivot pin 516. The contact support plate 520 is formed in a substantially rectangular cross-section with the contact connecting point 522 proximate the center of its forwardmost side. The contact support plate 520 is pivotally mounted to the handle grip 506 at point 524 proximate the center of its rearward side.

The contact support plate 520 and the rocker switch 514 are biased to an intermediate position (as illustrated in FIG. 15) wherein the pivot points 516 and 524 and the connection point 522 are aligned along a common central axis. The contact support plate 520 includes upper and lower contacts 526 and 528 mounted thereon and extending along the upper and lower sides thereof.

The handle grip 506 further houses receiving contacts 530 and 532 aligned in an abutting relationship with the contact support plate 520 and positioned immediately above and below the corresponding upper and lower contacts 526 and 528.

The contact support plate 520 is positioned such that the upper contact region 526 electronically engages the receiving contact 530 when the support plate 520 is rotated upward about the pivot point 524. Similarly, the support plate 520 is located such that the lower contact area 528 electronically engages the lower receiving contact 532 when the support plate 520 is pivoted downward about the pivot point 524.

During operation, the rocker switch 514 may be pivoted about its central pin 516 in the upward direction (as illustrated by the clockwise arrow 534) or downward (as illustrated by the counterclockwise arrow 536). When rotated in the clockwise direction, the rocker switch 514 causes the contact support plate 520 to rotate downward about pin 524 until the lower contact area 528 engages the receiving contact 532. Similarly, when rotated downward, the rocker switch 514 drives the support plate 520 upward until the upper contact 526 engages the receiving contact 530.

Returning to FIG. 8, when the rocker switch 514 is rotated clockwise (i.e., upward), the contacts 528 and 532 are engaged thereby energizing the motor 404 and directing the pump 405 to supply fluid to the lifting cylinder 320. In this manner, the cylinder 320 is electronically controlled to lift the concrete saw by driving the rocker switch 514 upward. To effect a lowering operation, the rocker switch 514 is rotated downward (i.e., counterclockwise) such that the contacts 526 and 530 engage one another. As illustrated in FIG. 8, when the contact 530 is energized it opens the normally closed control valve 424 thereby allowing fluid to be discharged from the cylinder 320 along lines 418 and 428 to the reservoir 400. In this manner, the hydraulic cylinder 320 is electronically controlled to lower the saw.

As a further alternative, the rocker switch may be implemented as illustrated in FIG. 16. FIG. 16 illustrates control lever 7 having a rocker switch 1000 included therein with three leads 1002 extending through a hollow channel within the control lever. The switch 1000 includes a rocker grip 1004 within its outer face which is normally biased to a neutral middle position. The rocker 1004 may be toggled upward or downward to close a circuit within leads 1002 which controls an electric motor and control valve (FIG. 8) to raise and lower the saw. The switch 1000 may be one which is offered by Otto Controls of Otto Engineering Inc. from Carpentersville, Ill.

Turning to FIG. 10, a portion of the control panel is illustrated containing the depth indicator 600, a depth indicator zero/reset dial 602, the depth stop set/reset switch 604 and the engine speed selector switch 606. The depth indicator 600 includes an analog dial indicating the current depth of the cut being effected by the saw blade with respect to a predefined reference level. This reference level may be reset at any time during operation to the current setting of the saw blade by rotating the depth indicator zero control 602. When utilizing the depth stop mechanism to set the maximum depth of a cut, the depth stop set/reset switch 604 is utilized. The set/reset switch 604 includes a two state switch. When in the set state 608 (as illustrated in FIG. 10), the control valve 432 (FIG. 8) is closed, thereby capturing a current amount of fluid in the depth stop cylinder 322. When it is desirable to reset the depth control cylinder 322 to a different level, the set/reset switch 604 is toggled to the reset state 610, thereby energizing the normally closed control valve 432 and allowing fluid to flow therethrough along line 420 (FIG. 8). This reset state 610 is maintained until the height control cylinder 320 is adjusted via the rocker switch 514 to a desired height. Thereafter, the set/reset switch 604 is toggled to the set state 608 and the valve 432 is closed to capture a current amount of fluid within the depth stop cylinder 322. When so captured, this fluid prevents the cylinder 322 from retracting beyond its current position, thereby preventing the front axle assembly from lowering beyond this level. It should be understood that the depth stop cylinder 322 will be extended, while the control valve 432 is closed, as it will simply form a vacuum within the fluid chamber.

Turning to FIGS. 13–14, the control assembly for the control lever 7 is illustrated, generally designated by the reference numeral 700. The control assembly 700 includes an upper face plate 708 having a H-shaped pattern 710 cut therethrough which defines the control path of the lever 7. The control lever 7 may move within the control pattern 710 along a forward-reverse direction (as defined by arrow 712) and along a side-to-side direction (as outlined by arrow 714).

The control lever 7 includes a lower end pivotally mounted at an intermediate point along a transverse support bracket 702. The support bracket is mounted upon a pivot pin 704 secured at opposite ends to the assembly housing 706. The pivot pin 704 has a longitudinal axis extending parallel to the direction of movement 712. The support bracket 702 allows the lever 7 to be moved from side-to-side along arrow 714 as the bracket 702 rotates about the pin 704.

The control lever 7 is further mounted along its side to a brace 716 having a lower end pivotally mounted at point 718 to an upper flange 720 of the support bracket 702. The brace 716 provides support for the control lever 7. The brace 716 and the control lever 7 sandwich a half-moon shaped guide plate 722 therebetween which is securely mounted upon the flange 720 and extending upward therefrom in abutting relation with the control lever 7. A teardrop shaped link 724 is mounted upon an opposite side of the brace 716 at the point 718. The teardrop shaped link 724 extends outward from the pivot point 718 to pivotally receive the control cable 11 at its outermost point 728. The teardrop 724 is fixedly mounted along an outer side of the brace 716, to maintain a fixed angular relation therebetween at all times. This fixed arrangement causes the link 724 to pivot around 718, thereby driving the cable 11 forward and backward along arrow 730 as the brace 716 is pivoted about the point 718. This pivotal motion is caused by the handle 7 when the operator moves the handle along either side of the H-shaped pattern 710 in a direction parallel to the arrow 712.

The support bracket 702 includes a lower extension 754 that is triangularly shaped and extends downward below the pivot pin 704. The extension 754 includes flared bottom end 756 which securely receives the sheath for the control cable 11. The extension 754 includes a ball joint connector 758 upon one side thereof. The ball joint 758 pivotally adjoins one end of a linking arm 760. An opposite end of the linking arm 760 is pivotally connected with the toggle arm 489. The arm 489 pivots about its center point 762 upon a brace 764. The lower end of the arm 489 pivotally joints the shifting shaft 488.

As the lever 7 is moved along the path 714, the lower extension 754 pulls and pushes upon the linking arm 760 which pivots the toggle arm 489. The toggle arm 489 directs linear motion within the shaft 488, thereby shifting the transmission between high, neutral and low states.

For purposes of explanation, it is assumed that regions 740 correspond to the forward movement of the concrete saw while regions 742 correspond to reverse movement of the concrete saw. Regions 744 correspond to stop positions while region 746 corresponds to a neutral position.

During operation, when a user desires to move the concrete saw forward, the control lever 7 is moved to one of regions 740. When so moved, the link 716 rotates forward, thereby causing the link 724 to rotate downward and push upon the cable 11. Responsive thereto, the cable 11 directs the hydrostatic pump 15 to pump fluid in a direction necessary to rotate the motor in a direction corresponding to forward movement of the saw. As the lever 7 is moved further forward from the stop position 744 toward the forwardmost position 740, the volummetric displacement of the pump 15 increases thereby increasing the forward rotational speed of the motor 18 from a stopped position to a fastest rotational speed.

Similarly, when the operator desires to move the concrete saw in a reverse direction, the control lever 7 is moved to one of the points 742. As the lever 7 is moved in this direction, the brace 716 rotates therewith, causing the link 724 to pull the cable 11. As the cable 11 is pulled, it directs the hydrostatic pump 15 to pump fluid in a direction to rotate the motor 18 in a direction corresponding to reverse movement of the concrete saw. As the lever 7 is moved from the stop positions 744 to one of the reversemost positions 742, the cable 11 directs the hydrostatic pump to increase its flow rate, thereby increasing the motor's reverse rotational speed. In this manner, the operator may move the concrete saw forward and backward or maintain it in a halted position by moving the lever 7 from one of points 742 to one of points 740 or 744.

The control lever 7 similarly effects shifting of the transmission 14 between high, neutral and low ranges by moving laterally in the direction of arrow 714. By way of example, the region 748 may correspond to a low range while the region 750 may correspond to a high range. When the user desires to operate in the low range, the lever 7 is shifted laterally to the low range area 748, thereby causing the support bracket 702 to pivot in a clockwise direction (as viewed in FIG. 14), which causes the extension 754 to push the link 760 downward, thereby rotating the toggle arm 489 counter clockwise (in FIG. 14) and driving the shaft 488 inward toward the transmission 14. Thus, the shaft 488 causes the low range gears to engage.

Divergently, when the user desires to operate in a high range, the lever 7 is moved laterally along direction 714 to region 750. This lateral movement causes the support bracket 702 to rotate in the opposite direction thereby causing the extension to rotate in the opposite direction and pull the arm 760 upward. Upward movement of the arm 760 rotates the toggle arm 489 clockwise (FIG. 14), thereby pulling outward upon the shaft 488 and shifting the gears to a high range.

If the lever 7 is maintained at the neutral state 746, the linking arm 760, toggle arm 489 and shaft 488 shift the gears into a neutral state.

FIG. 10 illustrates the control panel 850 which contains a raised rear face 852 and front and back walls 854 and 856, respectively. The front and rear walls include holes 855 and 857 therethrough that alien with one another. Aligned hole pairs are located on opposite sides of the front and rear walls 854 and 856. While only one side of the control panel is illustrated, the opposite side includes a similar handle assembly. Each hole pair receives a hollow handle tube 858 which is supportably housed within resilient isolators 860. The isolators may be constructed of rubber or any similarly resilient material. The isolators are fractionally received within U-shaped channel retainers 862 which have flared outer sides. The flares outer sides of the retainers 862 are fixedly mounted to side panels for the control panel 850 (the side panel has been removed for illustration purposes).

Once the retainers 862 are securely affixed to the side panels, the retainers 862 bind the isolators 860 in position which similarly bind the handle tube 858 against linear movement. The isolators 860 are located in abutting relation to the holes 855 and 857 to seal same and thus preventing dirt from entering the control panel and noise from escaping.

The rear end of each handle tube 858 receives a locking collar 864 thereabout. A set screw secures the collar 864 to the tube 858. The handle tube 858 slidably a handle bar 866 in a rear end thereof. The handle bar 866 includes a resilient handle grip 868 upon its rear end for the operator to grasp and steer the saw. A locking pin 870 is threadably received within the collar 864 and passes through a hole in the tube 858. The lower end of the pin 870 engages the handle bar 866 to maintain same in a fixed position within the handle tube 858.

The handle assembly of FIG. 10 affords the user with adjustable steering handles that are isolated from saw and engine vibrations.

The raised rear face 852 of the control panel includes a top surface 872 located above the control panel and the rear face 852. The top surface 872 includes a hole 874 therethrough which admits a fuel tank fill spout 876 sealed with a fuel cap 878.

Figure 11:
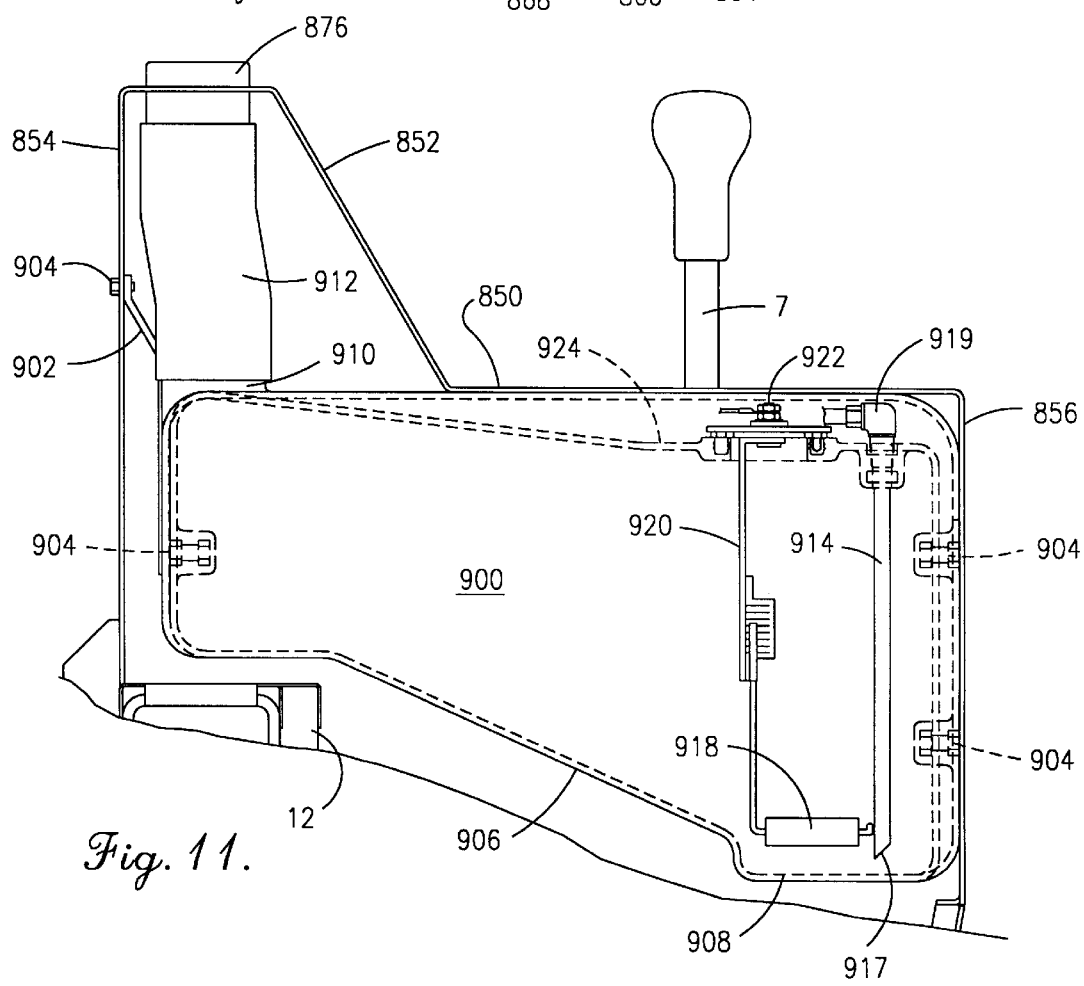
FIG. 11 illustrates a side sectional view of the upper rear portion of the present saw showing the fuel tank.

FIG. 11 illustrates the fuel tank placement and arrangement in detail. A fuel tank 900 is located immediately below the control panel 850 and spans the distance between the front and rear walls 854 and 856. The fuel tank 900 is mounted in place via a front support bracket 902 and bolts 904. The fuel tank 900 is formed with a trapezoidal shaped with a ramp shaped lower side 906 and with a bottom well 908. The forwardmost end of the tank 900 includes a fill nipple 910 which is sealably received within a lower end of a flexible hose 912. An upper end of the hose 912 is securely received within the fill spout 876 which is securely mounted to the top surface 872 of the control panel 850. The fill spout 876 ensures that the fuel filling point remains located above the fuel level at all times regardless of whether saw is raised or lowered. The rear end of the fuel tank receives a fuel draw tube 914 which includes an open bottom end 916 which draws fuel from the bottom of the tank. The tube 914 is supported by and attached to a fitting 917 which also connects with a fuel line (not shown) that delivers fuel to the engine.

The fuel tank 900 fuel includes a float 918 attached to a stem 920 that is support ed by an electronic fuel level monitor 922. The monitor 922 delivers an electronic signal, via an electric wire (not shown) to an electronic fuel gauge located on the control panel 850. The outer top surface 924 of the fuel tank includes a trough along its length extending between the front and back ends of the fuel tank. The trough provides a passage for the fuel line and electric line.

Figure 12:
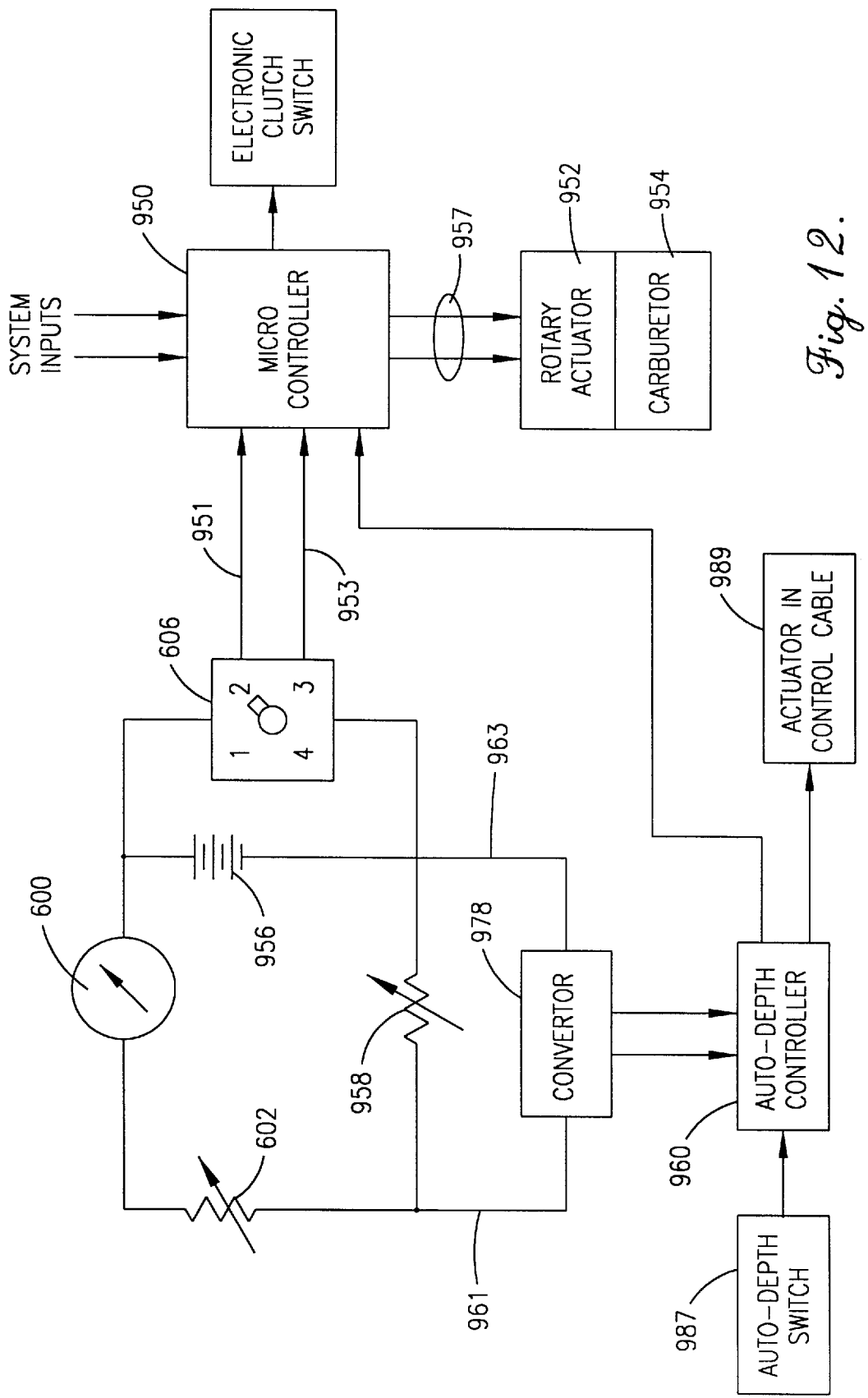
FIG. 12 illustrates a schematic view of the control system for controlling the electronic governor, the depth indicator and the automatic depth control mechanism.

FIG. 12 illustrates the control circuitry for the electronic governor, the depth indicator and the automatic depth controller.

The electronic governor system includes a microcontroller 950, the four speed control switch 606, a rotary actuator 952 and the carburetor 954. The control switch 606 is connected to the controller 950 via first and second lines 951 and 953, each of which delivers a high or a low signal (e.g., 0 V or 12 V) to identify the current position of the switch 606. For instance, when the switch is set to the first speed (1), both lines 951 and 953 output a low signal. When the switch is set to the second speed (2), the a first control line 951 outputs a high signal and the second line 953 outputs a low signal. When the switch is set to the third speed (3), the second line 953 outputs a high signal while the first line 951 outputs a low signal. When the switch is set to the fourth speed (4), both lines 951 and 953 output high signals.

The controller 950 receives these high and low signals and identifies the desired speed setting. Once the controller 950 receives a speed selection signal, it outputs a control signal along line 957 to the actuator 952 directing the actuator 952 to adjust the setting of the carburetor 954. For instance, the actuator 952 may be adjusted in a linear relation to the level of the signal from the controller 950 to effect the desired amount of variation within the setting of the carburetor. The controller 950 internally stores a separate actuator control signal for each input signal combination on lines 951 and 953 from the selector switch 606, and outputs the corresponding actuator control signal based on the incoming selector switch signal.

The controller 950 includes a communications port to enable the controller to be reprogrammed periodically to adjust the actuator positions associated with each speed selector switch position. Thus, the governor may be reprogrammed as desired by the manufacturer or distributor.

However, the controller is only adjustable through this software communications link, thereby preventing the operator from adjusting the carburetor.

FIG. 12 further illustrates the depth indicator system which includes the depth indicator 600, depth reset knob 602 and depth sensor 958. The depth sensor 958 may be a potentiometer (i.e., a variable resister) located upon the front axle assembly proximate the one of the pivot pins 306. The depth sensor 958 is located such that the resistance of the potentiometer varies as the front axle assembly rotates. This resistance variation maintains a relationship with the rotary position of the front axle assembly. The depth indicator 600 includes an ohmmeter which monitors the resistance variation across the sensor 958. As this resistance varies, the dial within the indicator 600 similarly moves to identify the depth of the cut.

The depth reset knob 602 may also represent a potentiometer connected in series with the indicator 600 and the sensor 958. The reset knob 602 may be varied by the operator to adjust the resistance monitored by the indicator 600. In operation, once the user adjusts the level of the saw to a desired reference level (i.e., ground level or the flush with the bottom of a previous cut), the user turns the reset knob 602 until the indicator 600 is "Zeroed". As the knob 602 turns it varies the resistance monitored by the indicator 600 until it displays a zero reading.

For instance, the indicator 600 may display a maximum cut depth when it reads 0 ohms of resistance and a minimum cut depth when it reads 1000 ohms of resistance. The sensor 958 may be configured to vary between 1000 and 0 ohms resistance as the front axle assembly rotates between a zero cut depth and a maximum cut depth (displayable upon the indicator 600). The resistance within the depth reset button may be varied between 0 and 1000 ohms.

Assume an operator desired to effect a second pass through a 3 inch deep cut and to remove an additional 3 inches of concrete during the second pass. First, the operator lowers the blade into the previous 3 inch cut. At this time the sensor outputs a resistance reading corresponding to a 3 inch cut (e.g., 700 ohms) and the depth reset knob 602 outputs a minimum resistance (e.g., 0 ohms). The indicator 600 reads 700 ohms which corresponds to a 3 inch cut depth. To zero the indicator 600, the operator turns the knob 602, thereby increasing the resistance output therefrom to 1000 ohms. Now the indicator reads 1000 ohms of resistance (i.e., 700 from the sensor and 300 from the knob) and displays a zero cut depth. Thereafter, as the saw blade lowers the sensor 958 decreases its resistance output thereby decreasing the resistance monitored by the indicator 600 which identifies the new cut depth.

Optionally the depth indicator circuit may be implemented using a micro-controller and any other equivalent electronic circuitry.

FIG. 12 further illustrates a micro-controller 960 which effects an automatic depth control function. The controller 960 includes a converter 970 connected to the input leads 961 and 963 which are connected in parallel with the sensor 958. The converter 970 monitors the resistance across leads 961 and 963 and outputs a signal representative of this resistance. The controller 960 reads the converter output signal to determine if the depth of cut is varying. The controller 960 is activated via a signal from a control switch upon the control panel. The controller 960 delivers an output signal to control an actuator attached to the control cable 11 to vary the volummetric displacement of the pump 15 and thus varying the saw ground speed according to the depth of cut.

When the operator desires to activate the automatic depth control function, the operator first sets the saw blade to the desired depth. Thereafter, the operator flips the automatic depth switch which energizes the controller 960. Once energized, the controller 960 reads the current signal from the converter 970 representative of the current resistance value across the sensor 958. The controller 960 stores this signal as its reference signal and thereafter continuously monitors the signal from the converter 970. When the saw ground speed exceeds the maximum speed at which the saw blade is able to maintain a current depth, the saw blade begins to lift to a lesser cut depth. The front axle assembly similarly moves, thereby adjusting the resistance across the sensor 958. This change in resistance is sensed by the converter 970 which outputs a correspondingly different output voltage to the controller 960. The controller 960 reads the converter signal, determines that it does not equal the reference signal and calculates a difference between the new converter signal and the reference converter signal. The controller 960 thereafter outputs a signal to the actuator directing the actuator to adjust the control cable 11, thereby reducing the volumetric displacement of the pump 15 and slowing the saws ground speed.

The controller 960 continuously monitors the converter output and outputs a corresponding actuator control signal until the converter output signal equals the converter reference signal. In this manner, the controller 960 is able to slow the saw ground speed when the saw blade raises above the desired cut depth. The controller 960 increases the saw around speed as soon as the saw blade lowers to its desired depth.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. For instance, the depth stop and depth indicator features may be utilized on any type of saw for cutting hard surfaces. This depth stop feature is not solely for use with saws having an in-line engine arrangement. Additionally, the electronic clutch and braking features may be utilized on any type of saw regardless of whether the saw includes an in-line engine arrangement or the inventive depth stop feature. Further the inventive drive assembly including the transmission with a neutral and a hydrostatic pump may be used with any type of saw regardless of the engine alignment, regardless of the depth stop mechanism and regardless of whether the saw includes an electronic clutch. Similarly, the inventive electronic governor assembly with a multiple speed selection switch may be used on any type of saw, as may the gas tank, shrouding, and every other inventive feature. The versatility of the inventive features is contemplated by and is recited within the scope of the claims.

Further, it is to be understood that the control panel will include additional control indicators, such as an electronic fuel gauge, a tachometer, an oil pressure gauge, a water temperature gauge, an amp meter, and the like. In addition the panel may include the automatic depth control switch 987.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A self-propelled concrete saw comprising:

an engine and a saw blade driveably mounted thereto, said saw blade effecting a cut within said concrete to a desired cut depth;

a body for supportably housing said engine and saw blade;

front and rear wheels for supporting said body; and a lifting and depth stop assembly, securely mounted between said front wheels and said body, including a first cylinder to raise and lower a front end of said body and a second cylinder to set a minimum height to which said body is lowered, said minimum height corresponding to said desired cut depth, said lifting and depth stop assembly further including a front axle assembly having a forward end that rotatably receives said front wheels and having a rearward end pivotally hinged to said body, and said first and second cylinders being mounted to said front axle assembly proximate said rearward end to rotate said front axle assembly about said rearward pivot point to raise and lower the saw blade, wherein at least one of said cylinders is controllably set to contract to a predefined level, thereby preventing lowering of said saw blade below said desired cut depth.

2. A concrete saw according to claim 1, said depth stop assembly further including a pump for driving said first and second cylinders via first and second supply lines, first and second valve means located within corresponding ones of said first and second supply lines to interrupt the flow of fluid between said cylinders and said pump, and control means for closing said second valve means to trap a desired amount of liquid within said second cylinder, thereby preventing said second cylinder from contracting beyond a predefined level, while allowing said second cylinder to expand as directed by said first cylinder.

3. A concrete saw according to claim 1, wherein said depth stop assembly further includes an electronic switch, mounted upon a control panel of said saw, for setting and resetting said minimum height to which said second cylinder will contract, thereby setting and resetting said desired cut depth.

4. A self-propelled concrete saw comprising:

an engine and a saw blade driveably mounted thereto, said saw blade effecting a cut within said concrete to a desired cut depth;

a body for supportably housing said engine and saw blade;

front and rear wheels for supporting said body;

a lifting and depth stop assembly, securely mounted between said front wheels and said body, including a first cylinder to raise and lower a front end of said body and a second cylinder to set a minimum height to which said body is lowered, said minimum height corresponding to said desired cut depth, and a depth stop indicator for identifying a current depth to which said saw blade is lowered, with respect to a predefined reference level, said depth stop indicator including means for resetting said reference level to any desired depth.

5. A self-propelled concrete saw comprising:

a frame;

front and rear wheels connected to said frame to movably support the frame on the surface to be cut;

a saw blade mounted on said frame for cutting concrete to a preselected cut depth;

an engine mounted on said frame and operatively connected to said saw blade; and a lifting and depth stop assembly, securely mounted between said front wheels and said frame, including a first cylinder to raise and lower a front portion of said frame on which said saw blade is mounted and a second cylinder to set a minimum height to which said front portion of said frame is lowered, said minimum height corresponding to said desired cut depth, said lifting and depth stop assembly further including a front axle assembly having a forward end that rotatably receives said front wheels and having a rearward end pivotally hinged to said frame, and said first and second cylinders being mounted to said front axle assembly proximate said rearward end to rotate said front axle assembly about said rearward pivot point to raise and lower the portion of said frame carrying said saw blade, wherein at least one of said cylinders is controllably set to contract to a predefined level, thereby preventing lowering of said frame portion and saw blade below said desired cut depth.

6. A concrete saw according to claim 5, said depth stop assembly further including a pump for driving said first and second cylinders via first and second supply lines, first and second valve means located within corresponding ones of said first and second supply lines to interrupt the flow of fluid between said cylinders and said pump, and control means for closing said second valve means to trap a desired amount of liquid within said second cylinder, thereby preventing said second cylinder from contracting beyond a predefined level, while allowing said second cylinder to expand as directed by said first cylinder.

7. A concrete saw according to claim 5, wherein said depth stop assembly further includes an electronic switch, mounted upon a control panel of said saw, for setting and resetting said minimum height to which said second cylinder will contract, thereby setting and resetting said desired cut depth.

8. A self-propelled concrete saw comprising:

a frame;

front and rear wheels connected to said frame to movably support the frame on the surface to be cut;

a saw blade mounted on said frame for cutting concrete to a preselected cut depth;

an engine mounted on said frame and operatively connected to said saw blade;

a lifting and depth stop assembly, securely mounted between said front wheels and said frame, including a first cylinder to raise and lower a front portion of said frame on which said saw blade is mounted and a second cylinder to set a minimum height to which said front portion of said frame is lowered, said minimum height corresponding to said desired cut depth; and a depth stop indicator for identifying a current depth to which said frame portion and saw blade is lowered, with respect to a predefined reference level, said depth stop indicator including means for resetting said reference level to any desired depth.

* * * * *